US012108402B2

(12) United States Patent
Taherzadeh Boroujeni et al.

(10) Patent No.: US 12,108,402 B2
(45) Date of Patent: Oct. 1, 2024

(54) INDICATION OF UPLINK CONTROL CHANNEL REPETITION IN WIRELESS COMMUNICATION

(71) Applicant: QUALCOMM Incorporated, San Diego, CA (US)

(72) Inventors: Mahmoud Taherzadeh Boroujeni, San Diego, CA (US); Tao Luo, San Diego, CA (US); Peter Gaal, San Diego, CA (US); Junyi Li, Fairless Hills, PA (US); Jelena Damnjanovic, Del Mar, CA (US); Juan Montojo, San Diego, CA (US); Iyab Issam Sakhnini, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 17/513,669

(22) Filed: Oct. 28, 2021

(65) Prior Publication Data

US 2022/0232555 A1 Jul. 21, 2022

Related U.S. Application Data

(60) Provisional application No. 63/138,145, filed on Jan. 15, 2021, provisional application No. 63/138,265, (Continued)

(51) Int. Cl.
*H04W 72/21* (2023.01)
*H04L 1/08* (2006.01)
*H04W 72/044* (2023.01)

(52) U.S. Cl.
CPC .............. *H04W 72/21* (2023.01); *H04L 1/08* (2013.01); *H04W 72/046* (2013.01)

(58) Field of Classification Search
None
See application file for complete search history.

(56) References Cited

U.S. PATENT DOCUMENTS 11,638,240 B2 * 4/2023 Park .................. H04L 1/1671
370/336
2015/0195069 A1 * 7/2015 Yi .................... H04L 5/0053
370/329

(Continued)

FOREIGN PATENT DOCUMENTS

WO 2021087856 A1 5/2021

OTHER PUBLICATIONS

International Search Report and Written Opinion—PCT/US2021/063377—ISA/EPO—Apr. 5, 2022.

(Continued)

*Primary Examiner* — Hassan A Phillips
*Assistant Examiner* — Gautam Sharma
(74) *Attorney, Agent, or Firm* — Loza & Loza LLP

(57) ABSTRACT

Aspects of the present disclosure relate to techniques for physical uplink control channel configuration and coverage enhancement in a wireless communication network. A base station can dynamically indicate a repetition factor for an uplink control channel to improve coverage of the uplink control channel. The base station can explicitly or implicitly indicate the repetition factor using various signaling techniques. The interpretation of an indication of a repetition factor can depend on one or more parameters, for example, a physical uplink control channel (PUCCH) format, an uplink control information size, a code rate, and/or a PUCCH resource set used for the PUCCH.

26 Claims, 15 Drawing Sheets

Related U.S. Application Data filed on Jan. 15, 2021, provisional application No. 63/138,241, filed on Jan. 15, 2021.

(56) References Cited

U.S. PATENT DOCUMENTS

| | | | | |
|---|---|---|---|---|
| 2017/0339682 | A1* | 11/2017 | Lee | H04L 1/188 |
| 2017/0353272 | A1* | 12/2017 | Takeda | H04L 5/0055 |
| 2019/0182824 | A1* | 6/2019 | Chatterjee | H04W 4/70 |
| 2019/0380052 | A1 | 12/2019 | Yang et al. | |
| 2021/0112587 | A1 | 4/2021 | Papasakellariou | |
| 2021/0266934 | A1 | 8/2021 | Deghel et al. | |
| 2022/0046692 | A1* | 2/2022 | Huang | H04B 1/713 |
| 2022/0225322 | A1* | 7/2022 | Shim | H04W 72/21 |
| 2022/0311545 | A1* | 9/2022 | Sun | H04W 72/21 |
| 2022/0385381 | A1* | 12/2022 | MolavianJazi | H04L 1/08 |
| 2022/0385401 | A1* | 12/2022 | Jiang | H04L 1/08 |
| 2022/0416957 | A1* | 12/2022 | Shao | H04L 1/1854 |
| 2023/0138449 | A1* | 5/2023 | Khoshnevisan | H04B 7/0695 370/329 |
| 2023/0309109 | A1* | 9/2023 | Gao | H04L 5/0091 370/329 |
| 2023/0388061 | A1* | 11/2023 | Shen | H04L 1/1819 |

OTHER PUBLICATIONS

Lenovo, et al., "Enhancements on Multi-TRP for PDCCH, PUCCH and PUSCH", 3GPP Draft, 3GPP TSG RAN WG1 #102-e, R1-2005821, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 7, 2020 (Aug. 7, 2020), XP051915046, 7 Pages Retrieved from the Internet: URL: https://ftp.3gpp.org/tsg_ran/WG1_RL1/TSGR1_102-e/Docs/R1-2005821.zip [Retrieved on Aug. 7, 2020] Section 3.

* cited by examiner

| Bit string | PUCCH Repetition Factor |
|---|---|
| 000 | Not Used |
| 001 | 1 |
| 010 | 2 |
| 011 | 3 |
| 100 | 4 |
| 101 | 5 |
| 110 | 6 |
| 111 | 7 |

FIG. 7

INDICATION OF UPLINK CONTROL CHANNEL REPETITION IN WIRELESS COMMUNICATION

PRIORITY CLAIM

This application claims priority to and the benefit of provisional patent application No. 63/138,241 filed in the United States Patent Office on 15 Jan. 2021, provisional patent application No. 63/138,145 filed in the United States Patent Office on 15 Jan. 2021, and provisional patent application No. 63/138,265 filed in the United States Patent Office on 15 Jan. 2021, the entire content of each provisional application is incorporated herein by reference as if fully set forth below in its entirety and for all applicable purposes.

TECHNICAL FIELD

The technology discussed below relates generally to wireless communication systems, and more particularly, to techniques for indicating physical uplink control channel repetition in wireless communication.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In a wireless network, for example, a 5G NR network, a user equipment (UE) can communicate with a network entity (e.g., base station) using various uplink (UL) and downlink (DL) channels. An exemplary UL channel is a physical uplink control channel (PUCCH). The UE can transmit various information to the network via the PUCCH. In one aspect, the PUCCH can carry uplink control information (UCI) that can include hybrid automatic repeat request (HARQ) feedback, channel state information (CSI), and scheduling request (SR). Therefore, the PUCCH is important for maintaining the communication between the UE and the network.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the disclosure provides a user equipment (UE) for wireless communication. The UE includes a communication interface for wireless communication, a memory, and a processor coupled to the communication interface and the memory. The processor and the memory are configured to receive, from a base station, control information via the communication interface. The processor and the memory are further configured to determine a repetition factor based on the control information, the repetition factor indicating a repetition count for transmitting repetitions of an uplink control message. The processor and the memory are further configured to transmit, to the base station via the communication interface, repetitions of the uplink control message according to the repetition count.

Another aspect of the disclosure provides a method of wireless communication at a user equipment (UE). The method includes receiving control information from a base station. The method further includes determining a repetition factor based on the control information, the repetition factor indicating a repetition count for transmitting repetitions of an uplink control message. The method further includes transmitting, to the base station, repetitions of the uplink control message according to the repetition count.

Another aspect of the disclosure provides a base station for wireless communication. The base station includes a communication interface for wireless communication, a memory, and a processor coupled to the communication interface and the memory. The processor and the memory are configured to transmit, to a UE, control information via the communication interface, the control information including an indication of a repetition factor corresponding to a repetition count of an uplink control message. The processor and the memory are further configured to receive, from the UE via the communication interface, the uplink control message repeated according to the repetition count.

Another aspect of the disclosure provides a method for wireless communication at a base station. The method includes transmitting control information to a UE, the control information including an indication of a repetition factor corresponding to a repetition count of an uplink control message. The method further includes receiving, from the UE, the uplink control message repeated according to the repetition count.

These and other aspects of the invention will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain examples and figures below, all implementations can include one or more of the advantageous features discussed herein. In other words, while one or more examples may be discussed as having certain advantageous features, one or more of such features may also be used in accordance with the various implementations discussed herein. In similar fashion, while exemplary implementations may be discussed below as devices, systems, or methods, it should be understood that such exemplary implementations can be implemented in various devices, systems, and methods.

BRIEF DESCRIPTION OF THE DRAWINGS

FIG. 7 is a diagram illustrating exemplary bit string values and corresponding PUCCH repetition factors according to some aspects.

DETAILED DESCRIPTION

Figure 1:
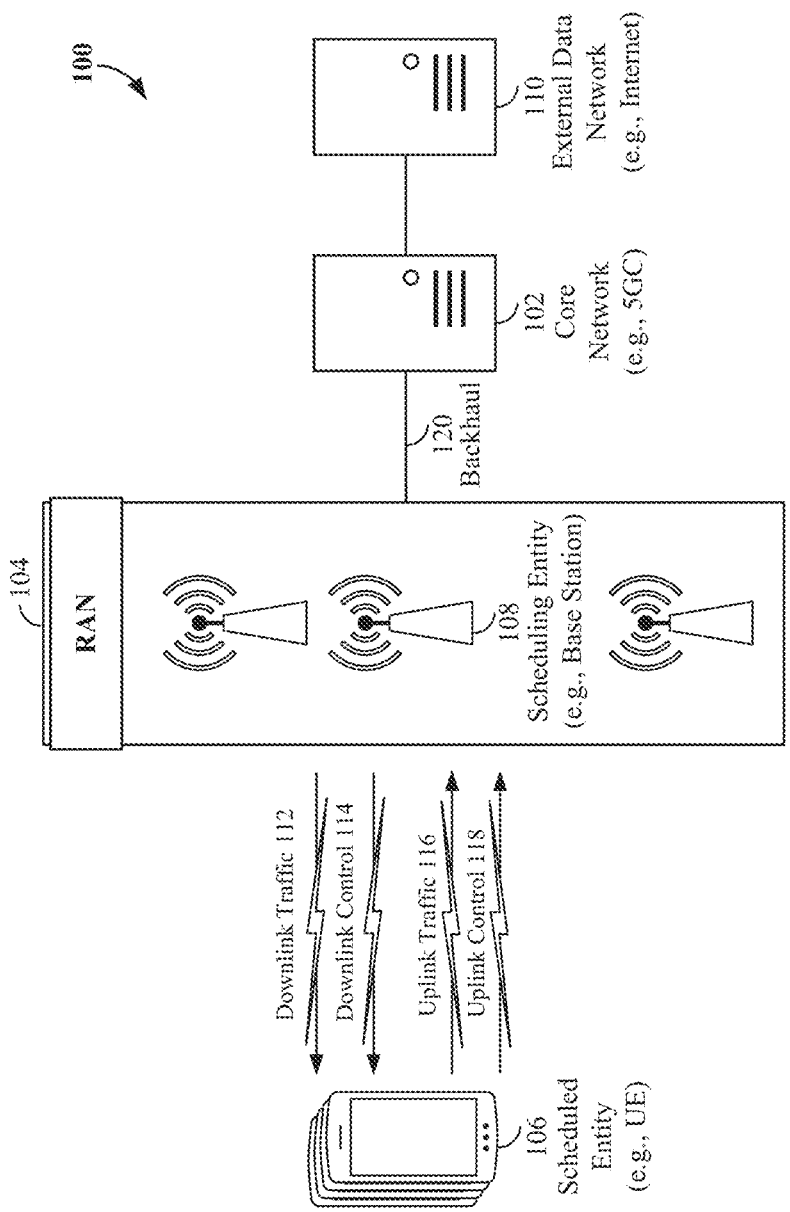
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure relate to techniques for physical uplink control channel configuration and coverage enhancement in a wireless communication network. In some aspects, a base station can dynamically indicate a repetition factor for an uplink control channel to improve coverage of the uplink control channel. In some aspects, a base station can explicitly or implicitly indicate the repetition factor using various signaling techniques. In some aspects, the interpretation of an indication of a repetition factor may depend on one or more parameters, for example, a physical uplink control channel (PUCCH) format, an uplink control information size, a code rate, and/or a PUCCH resource set used for the PUCCH.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described implementations. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, radio frequency (RF) chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 114 and/or 118 and/or traffic information 112 and/or 116 may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
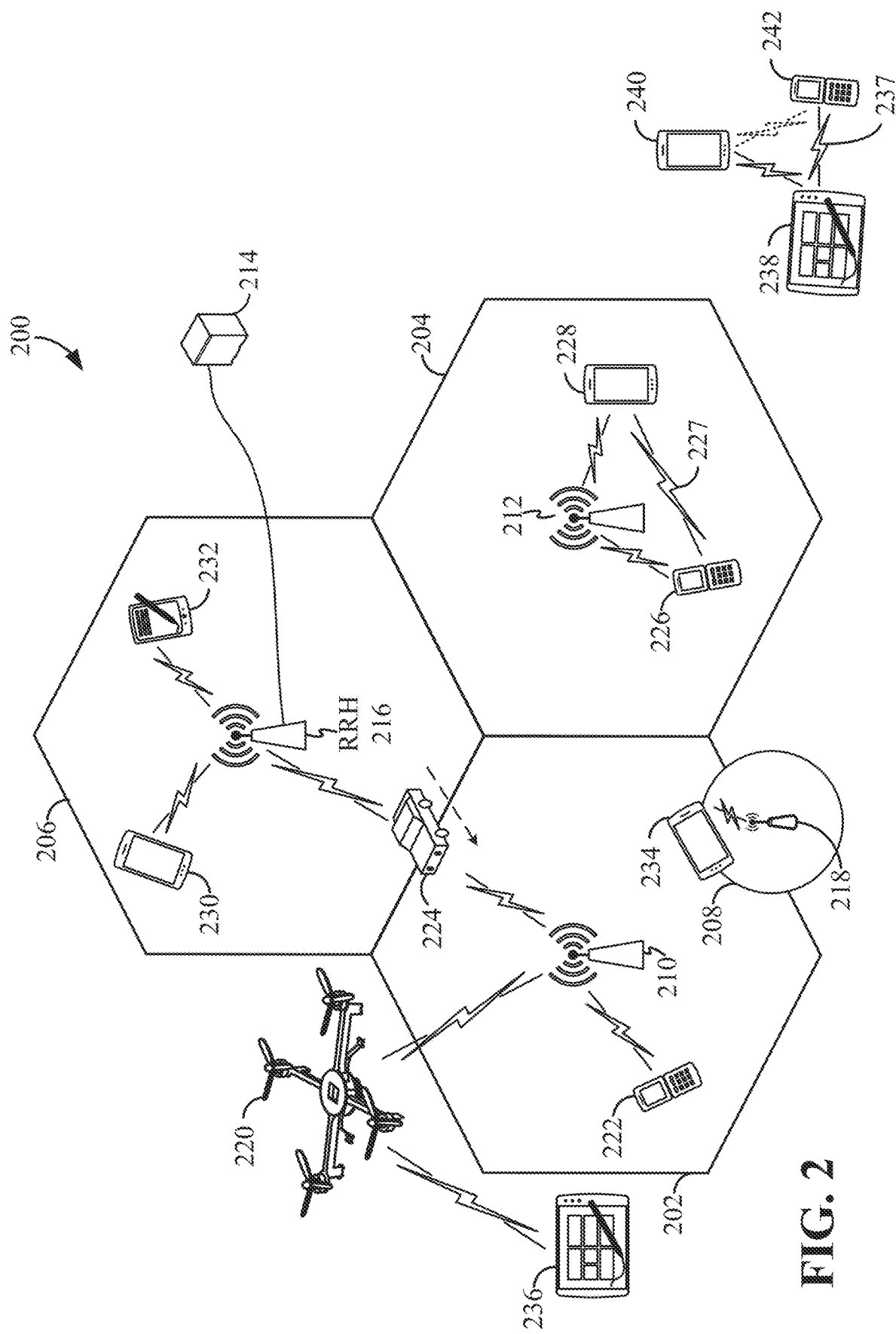
FIG. 2 is an illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be a quadcopter or drone. The UAV 220 may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, the UAV 220 (e.g., quadcopter) may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 238, 240, and 242) may communicate with each other using peer-to-peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) and a security anchor function (SEAF) that perform authentication. The SCMF can manage, in whole or in part, the security context for both the control plane and the user plane functionality.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 206 to the geographic area corresponding to a neighbor cell 202. When the signal strength or quality from the neighbor cell 202 exceeds that of its serving cell 206 for a given amount of time, the UE 224 may transmit a reporting message to its serving base station 216 indicating this condition. In response, the UE 224 may receive a handover command, and the UE may undergo a handover to the cell 202.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may hand over the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for the exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. A shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Further, the air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
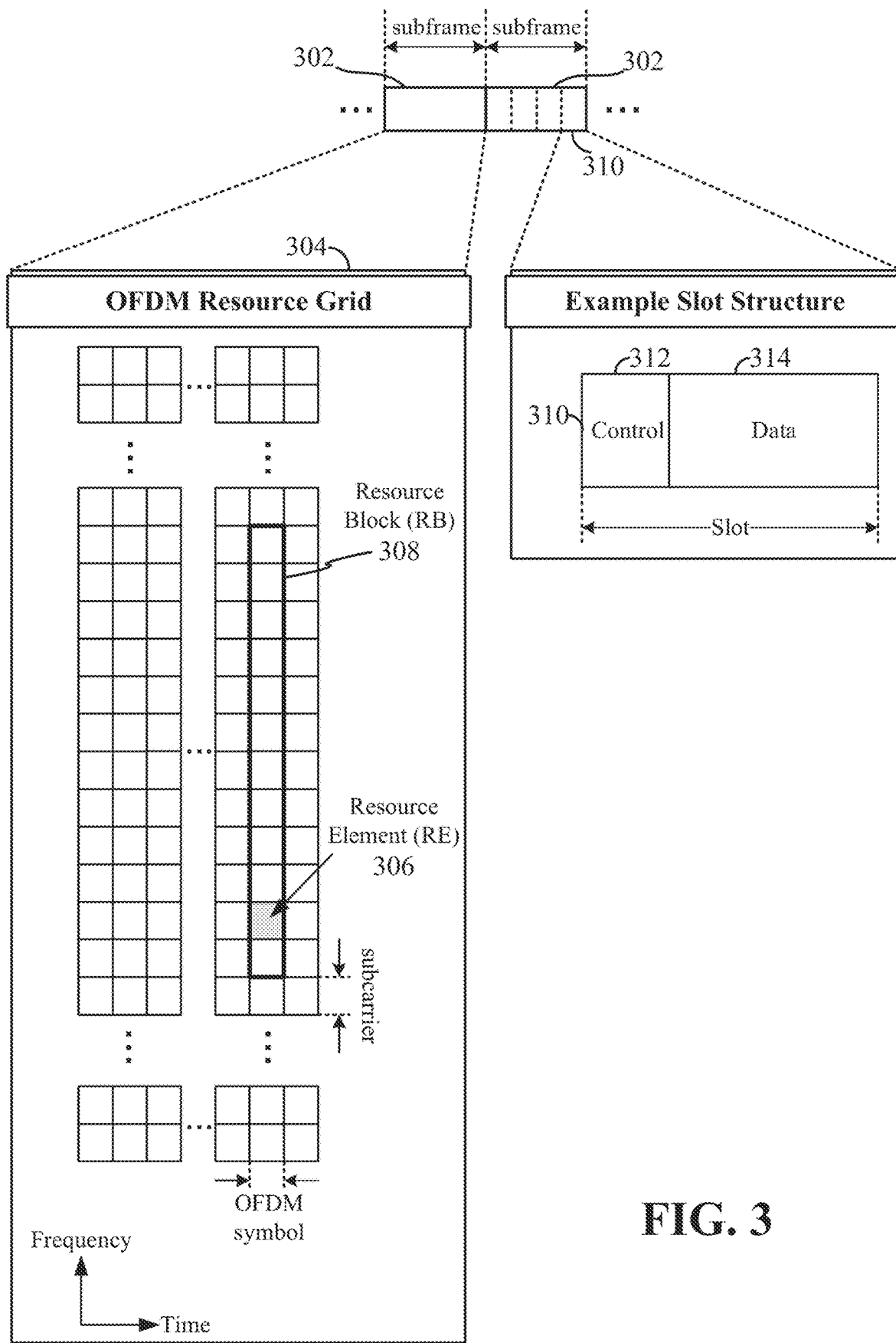
FIG. 3 is a schematic illustration of an organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the physical layer (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI. In some aspects, a UE can use various enhancement techniques described herein for PUCCH transmission to increase the coverage of the PUCCH.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIGS. 1-3 are not necessarily all of the channels or carriers that may be utilized between devices, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
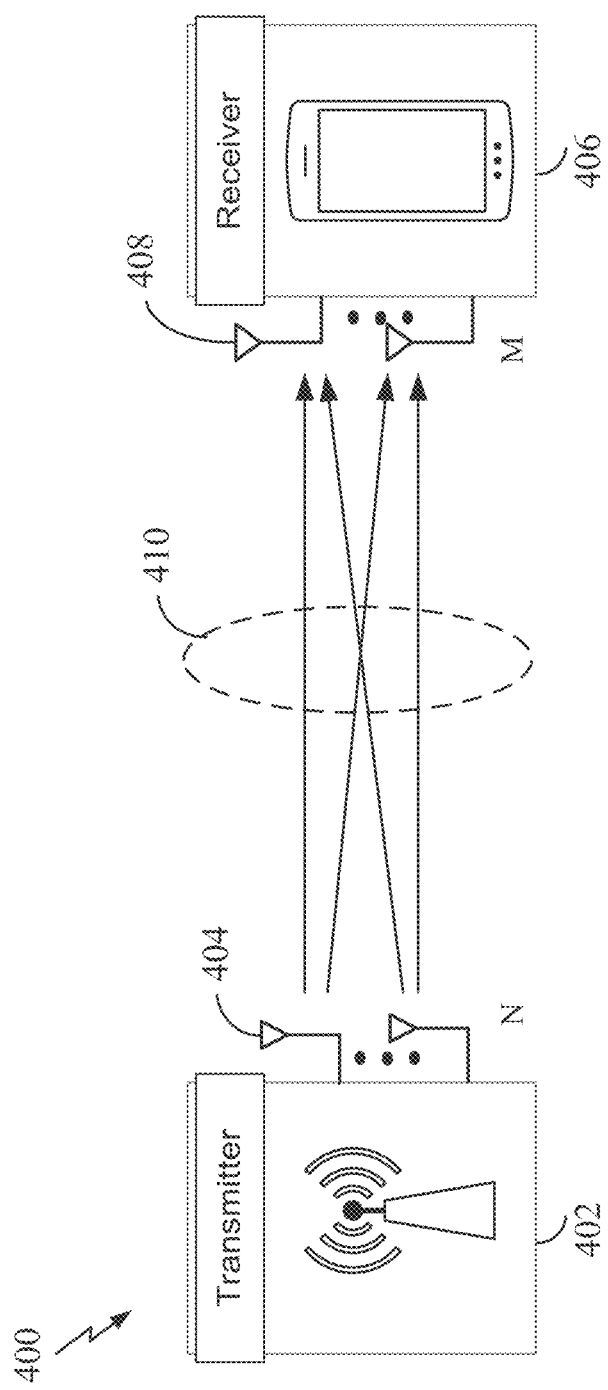
FIG. 4 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 4 illustrates an example of a wireless communication system 400 supporting MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit CSI-RSs with separate C-RS sequences for each layer to provide for multi-layer channel estimation. From the CSI-RS, the UE may measure the channel quality across layers and resource blocks and feed back the RI and a channel quality indicator (CQI) that indicates to the base station a modulation and coding scheme (MCS) to use for transmissions to the UE for use in updating the rank and assigning REs for future downlink transmissions.

In the simplest case, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G New Radio (NR) systems, particularly for FR2 (millimeter wave) systems, beamformed signals may be utilized for most downlink channels, including the PDCCH and PDSCH. In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the PUCCH and PUSCH. In addition, beamformed signals may further be utilized in D2D systems, such as NR sidelink (SL) or V2X, utilizing FR2.

Figure 5:
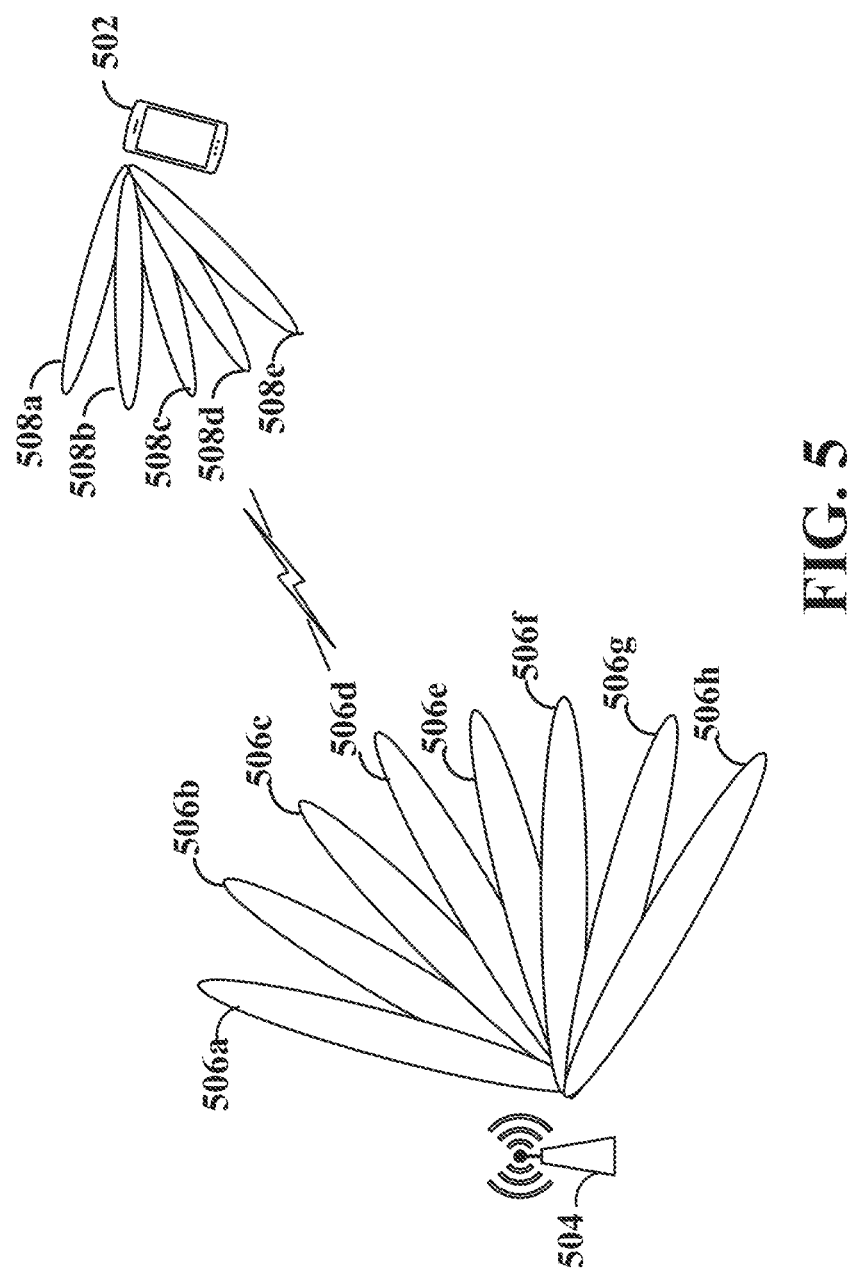
FIG. 5 is a diagram illustrating communication between a base station and a UE using beamformed signals according to some aspects.

FIG. 5 is a diagram illustrating communication between a base station 504 and a UE 502 using beamformed signals according to some aspects. The base station 504 may be any of the base stations (e.g., gNBs) or scheduling entities illustrated in FIGS. 1 and/or 2, and the UE 502 may be any of the UEs or scheduled entities illustrated in FIGS. 1 and/or 2.

The base station 504 may generally be capable of communicating with the UE 502 using one or more transmit beams, and the UE 502 may further be capable of communicating with the base station 504 using one or more receive beams. As used herein, the term transmit beam refers to a beam on the base station 504 that may be utilized for downlink or uplink communication with the UE 502. In addition, the term receive beam refers to a beam on the UE 502 that may be utilized for downlink or uplink communication with the base station 504.

In the example shown in FIG. 5, the base station 504 is configured to generate a plurality of transmit beams 506a-506h, each associated with a different spatial direction. In addition, the UE 502 is configured to generate a plurality of receive beams 508a-508e, each associated with a different spatial direction. It should be noted that while some beams are illustrated as adjacent to one another, such an arrangement may be different in different aspects. For example, transmit beams 506a-506h transmitted during a same symbol may not be adjacent to one another. In some examples, the base station 504 and UE 502 may each transmit more or less beams distributed in all directions (e.g., 360 degrees) and in three dimensions. In addition, the transmit beams 506a-506h may include beams of varying beam width. For example, the base station 504 may transmit certain signals (e.g., SSBs) on wider beams and other signals (e.g., CSI-RSs) on narrower beams.

The base station 504 and UE 502 may select one or more transmit beams 506a-506h on the base station 504 and one or more receive beams 508a-508e on the UE 502 for communication of uplink and downlink signals therebetween using a beam management procedure. In one example, during initial cell acquisition, the UE 502 may perform a P1 beam management procedure to scan the plurality of transmit beams 506a-506h on the plurality of receive beams 508a-508e to select a beam pair link (e.g., one of the transmit beams 506a-506h and one of the receive beams 508a-508e) for a physical random access channel (PRACH) procedure for initial access to the cell. For example, periodic SSB beam sweeping may be implemented on the base station 504 at certain intervals (e.g., based on the SSB periodicity). Thus, the base station 504 may be configured to sweep or transmit an SSB on each of a plurality of wider transmit beams 506a-506h during the beam sweeping interval. The UE may measure the reference signal received power (RSRP) of each of the SSB transmit beams on each of the receive beams of the UE and select the transmit and receive beams based on the measured RSRP. In an example, the selected receive beam may be the receive beam on which the highest RSRP is measured, and the selected transmit beam may have the highest RSRP as measured on the selected receive beam.

After completing the PRACH procedure, the base station 504 and UE 502 may perform a P2 beam management procedure for beam refinement at the base station 504. For example, the base station 504 may be configured to sweep or transmit a CSI-RS on each of a plurality of narrower transmit beams 506a-506h. Each of the narrower CSI-RS beams may be a sub-beam of the selected SSB transmit beam (e.g., within the spatial direction of the SSB transmit beam). Transmission of the CSI-RS transmit beams may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). The UE 502 is configured to scan the plurality of CSI-RS transmit beams 506a-506h on the plurality of receive beams 508a-508e. The UE 502 then performs beam measurements (e.g., RSRP, SINR, etc.) of the received CSI-RSs on each of the receive beams 508a-508e to determine the respective beam quality of each of the CSI-RS transmit beams 506a-506h as measured on each of the receive beams 508a-508e.

The UE 502 can then generate and transmit a Layer 1 (L1) measurement report, including the respective beam index (e.g., CSI-RS resource indicator (CRI)) and beam measurement (e.g., RSRP or SINR) of one or more of the CSI-RS transmit beams 506a-506h on one or more of the receive beams 508a-508e to the base station 504. The base station 504 may then select one or more CSI-RS transmit beams on which to communicate downlink and/or uplink control and/or data with the UE 502. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 502 may further select a corresponding receive beam on the UE 502 for each selected serving CSI-RS transmit beam to form a respective beam pair link (BPL) for each selected serving CSI-RS transmit beam. For example, the UE 502 can utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, in addition to performing CSI-RS beam measurements, the base station 504 may configure the UE 502 to perform SSB beam measurements and provide an L1 measurement report containing beam measurements of SSB transmit beams 506a-506h. For example, the base station 504 may configure the UE 502 to perform SSB beam measurements and/or CSI-RS beam measurements for beam failure detection (BRD), beam failure recovery (BFR), cell reselection, beam tracking (e.g., for a mobile UE 502 and/or base station 504), or other beam optimization purpose.

In addition, when the channel is reciprocal, the transmit and receive beams may be selected using an uplink beam management scheme. In an example, the UE 502 may be configured to sweep or transmit on each of a plurality of receive beams 508a-508e. For example, the UE 502 may transmit an SRS on each beam in the different beam directions. In addition, the base station 504 may be configured to receive the uplink beam reference signals on a plurality of transmit beams 506a-506h. The base station 504 then performs beam measurements (e.g., RSRP, SINR, etc.) of the beam reference signals on each of the transmit beams 506a-506h to determine the respective beam quality of each of the receive beams 508a-508e as measured on each of the transmit beams 506a-506h.

The base station 504 may then select one or more transmit beams on which to communicate downlink and/or uplink control and/or data with the UE 502. In some examples, the selected transmit beam(s) have the highest RSRP. The UE 502 may then select a corresponding receive beam for each selected serving transmit beam to form a respective beam pair link (BPL) for each selected serving transmit beam, using, for example, a P3 beam management procedure, as described above.

In one example, a single CSI-RS transmit beam (e.g., beam 506d) on the base station 504 and a single receive beam (e.g., beam 508c) on the UE may form a single BPL used for communication between the base station 504 and the UE 502. In another example, multiple CSI-RS transmit beams (e.g., beams 506c, 506d, and 506e) on the base station 504 and a single receive beam (e.g., beam 508c) on the UE 502 may form respective BPLs used for communication between the base station 504 and the UE 502. In another example, multiple CSI-RS transmit beams (e.g., beams 506c, 506d, and 506e) on the base station 504 and multiple receive beams (e.g., beams 508c and 508d) on the UE 502 may form multiple BPLs used for communication between the base station 504 and the UE 502. In this example, a first BPL may include transmit beam 506c and receive beam 508c, a second BPL may include transmit beam 508d and receive beam 508c, and a third BPL may include transmit beam 508e and receive beam 508d.

In some cases, wireless communications may suffer from signal attenuation (e.g., path loss), which may be influenced by various factors, such as temperature, barometric pressure, diffraction, etc. As a result, signal processing techniques such as beamforming may be used to overcome the path losses at these frequencies. Accordingly, transmissions from a base station (e.g., gNB) and/or a UE may be beamformed, and a receiving device may use beamforming techniques to configure antenna(s) and/or antenna array(s) such that transmissions are received in a directional manner. In some cases, a UE (e.g., UE 502) may select an active beam for communication with a network (e.g., base station 504) by selecting the strongest beam from among a number of candidate beams. In some cases, multiple UEs (such as UEs within a group) may use a same beam configuration.

In some cases, wireless communications systems, such as those operating in the millimeter wave frequency ranges (e.g., FR2), may experience a loss of communications due to a beam becoming weak or partially blocked. If a beam becomes weak, a base station may perform a beam switching procedure to determine a strong beam for communications. However, in some examples, the beam may be weak for a short period of time, such that performing a beam switching procedure may lead to inefficient use of processing resources or may take longer than the time in which the beam is temporarily weakened. Further, a base station may need to maintain communication with the UE even when the active beam is weak in order to determine a new beam for selection if needed. For example, it may be important for the base station to receive channel state information (CSI) feedback from a UE in order to determine a beam for selection. In some cases, maintaining communication with the UE may include maintaining a performance threshold or coverage on a unicast channel (e.g., a PUCCH). To maintain communication in the case of a beam becoming unreliable or weak, it may be beneficial to provide a method for coverage enhancement for the uplink channels (e.g., PUCCH), which may be enabled dynamically and, in some cases, in lieu of a beam switching or other beam management procedure.

Explicit Repetition Factor Indication for PUCCH

Figure 6:
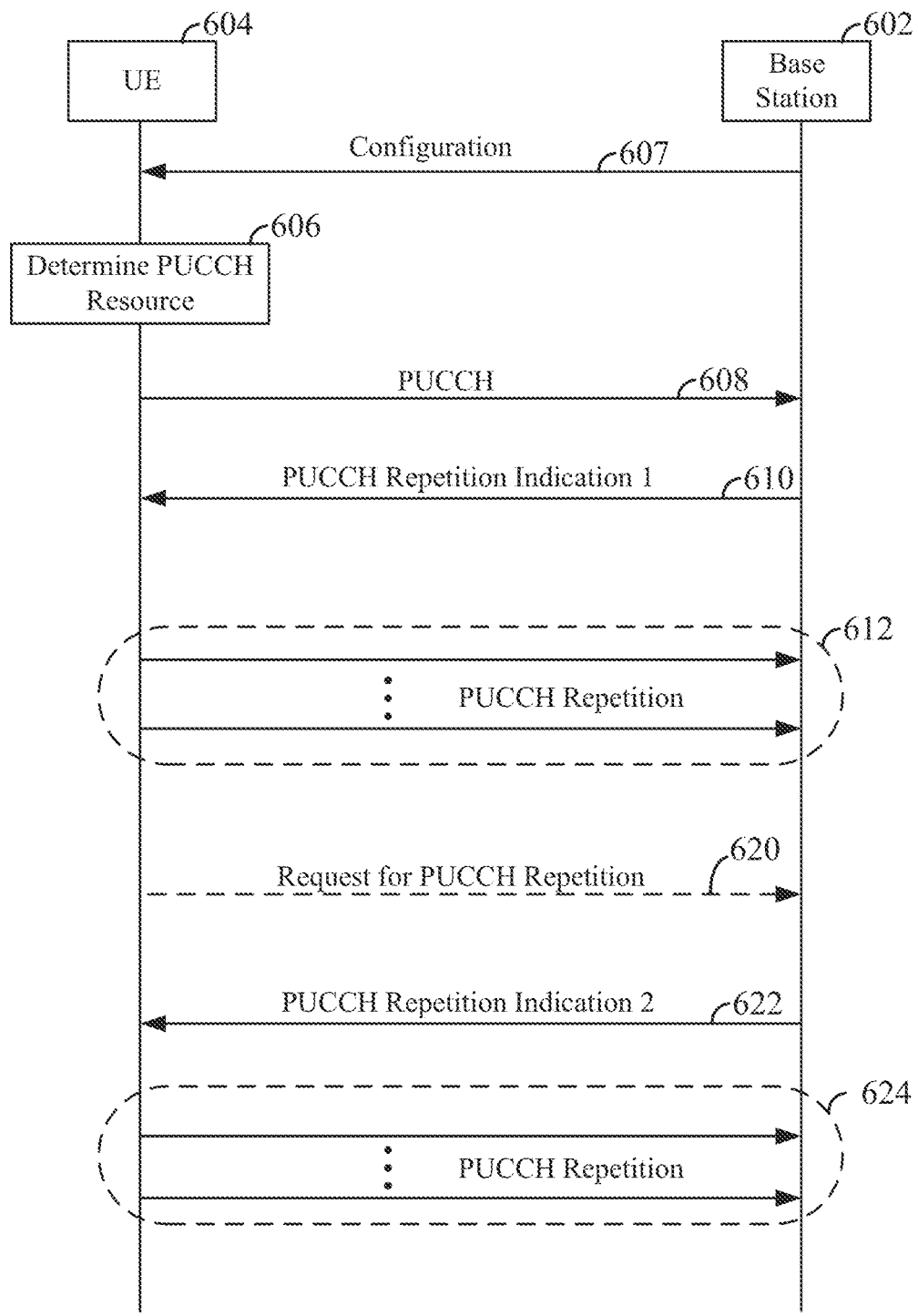
FIG. 6 is a diagram illustrating a process of explicitly indicating a physical uplink control channel (PUCCH) repetition factor according to some aspects.

In some aspects, a base station can explicitly signal a UE to use repetition for an uplink control channel for coverage enhancement. For example, one or more repetitions of PUCCH transmissions may be transmitted within a slot and/or across multiple slots. FIG. 6 is a diagram illustrating a process of explicitly indicating a PUCCH repetition factor according to some aspects. Using the PUCCH repetition factor (e.g., repetition count), a base station 602 (e.g., gNB) can cause a UE 604 to transmit repetitions of PUCCH transmissions, if needed. In some aspects, repeating a PUCCH transmission can enhance the coverage and/or reliability of the PUCCH. In some aspects, the UE can repeat the PUCCH transmission using the same or different communication resources (e.g., PUCCH resource sets).

At block 606, the UE 604 can determine one or more PUCCH resource sets for PUCCH transmission 608. The base station can configure communication resources (e.g., PUCCH resource sets) for the PUCCH transmission in various formats and/or code rates. In one example, the base station can transmit a PUCCH resource configuration 607 to the UE using RRC signaling (e.g., a PUCCH_Config RRC message). In one aspect, the PUCCH resource configuration can define one or more PUCCH resource sets (e.g., time domain and frequency domain resources) that can be used by the UE for PUCCH transmission. The UE can store the PUCCH resource configuration (e.g., enhancement configuration 1415) in a memory 1405 or computer-readable medium 1406 (see FIG. 14). Each PUCCH resource set can define the PUCCH format, first symbol, number of symbols, PRB offset, etc. of communication resources (e.g., one or more RBs 308) that can be used for PUCCH transmission. In some aspects, the PUCCH resource sets can be predefined or predetermined in applicable communication standards (e.g., 3GPP NR standards) or preconfigured by a device manufacturer of the UE or base station. In one example, the base station can indicate the PUCCH resource set to be used by transmitting a PUCCH resource indicator in DCI or SIB1 if predefined PUCCH resource sets are used.

In some scenarios, the base station 602 may dynamically configure the UE 604 to repeat the PUCCH transmission (i.e., PUCCH repetition), for example, to enhance PUCCH coverage if needed. Dynamically configuring or signaling PUCCH repetition enables the UE to start, stop, or change PUCCH repetition without using RRC or semi-static signaling. When PUCCH repetition is used, the UE 604 can repeat a PUCCH transmission in a predetermined number of slots or mini-slots. To that end, the base station 602 can transmit a first PUCCH repetition indication 610 to the UE 604 to explicitly indicate a PUCCH repetition factor. The base station 602 can transmit the first PUCCH repetition indication 610 using dynamic signaling. For example, the base station 602 can transmit the first PUCCH repetition indication 610 via DCI destined to the UE 604. In one example, the base station 602 can transmit the first PUCCH repetition indication 610 via a medium access control (MAC) control element (CE). In response to the first PUCCH repetition indication 610, the UE 604 can repeat the PUCCH transmission 612 (i.e., repetitions of PUCCH transmissions) according to the first PUCCH repetition indication 610.

In some aspects, the first PUCCH repetition indication 610 may explicitly indicates a PUCCH repetition factor (PRF) that controls PUCCH repetitions such that the UE 604 can determine the PRF directly from the repetition indication 610. In one aspect, the first PUCCH repetition indication 610 may indicate a value, for example, represented by a bit string (e.g., one or more bits) that corresponds to the value (e.g., binary value) of the PRF. For example, if the PRF has a value of 2, the bit string may be '10'; if the PRF has a value of 3, the bit string may be '11', and if the PRF has a value of 4, the bit string may be '100'. FIG. 7 shows a table 700 illustrating exemplary bit string values and corresponding PUCCH repetition factor values according to one aspect. In this example, the bit string '000' is not used or reserved. The bit string values 001-111 respective indicate the values 1 to 7 for the PRF.

In some aspects, the first PUCCH repetition indication 610 may indicate a value, for example, a bit string that indicates an index value for identifying a PRF among a plurality of predefined PUCCH repetition factors. For example, the plurality of predefined PUCCH repetition factors may be defined in a table, database, or list (e.g., repetition factors 1417 of FIG. 14) that can be stored at the UE, and the PUCCH repetition indication can indicate an index for identifying the desired PRF among the predefined PUCCH repetition factors (e.g., see the table 700 of FIG. 7).

In some aspects, the UE can transmit a PUCCH repetition request 620 to the base station 602 for a UE-specific PUCCH repetition factor. In one aspect, the UE can transmit the repetition request 620 in a UCI. In another aspect, the UE can transmit the repetition request 620 in a MAC CE. In one aspect, the repetition request 620 can indicate the number of PUCCH repetitions desired by the UE. In one aspect, the repetition request 620 can indicate that the UE requests PUCCH repetition but does not indicate the number of PUCCH repetitions requested or desired. In one example, the repetition request 620 can indicate the need for PUCCH repetition, and the base station 602 can determine the value of the PUCCH repetition factor or PUCCH repetition counts. In one example, if the UE is already configured to repeat the PUCCH, the request 620 can indicate the need for increasing or decreasing the PUCCH repetition factor or repetition counts.

In one aspect, in response to the request 620, the base station 602 can transmit a second PUCCH repetition indication 622 to the UE. In one aspect, the second PUCCH repetition indication 622 can explicitly indicate the PUCCH repetition factor, for example, using a bit string as described above. In one aspect, the second PUCCH repetition indication 622 can indicate confirmation (e.g., approval or non-approval) without explicitly indicating the PUCCH repetition factor if the request 620 explicitly indicates the desired PUCCH repetition factor. In response to the second PUCCH repetition indication 622, the UE can repeat the PUCCH transmission 624 according to the second PUCCH repetition indication 622.

In some aspects, the base station 602 can indicate the PUCCH repetition factor in reference to a previous PUCCH repetition factor. For example, the second PUCCH repetition indication 622 can indicate that the UE can increase (e.g., two-fold increase) or decrease the PUCCH repetition factor in reference to the previous PUCCH repetition factor, for example, indicated by the first PUCCH repetition indication 610.

In one aspect, a PUCCH repetition indication can indicate that the PUCCH repetition factor is valid for a predetermined time interval (effective time interval). In one aspect, the base station can configure the UE to use a timer (e.g., timer 1430 in FIG. 14) to keep track of the valid time of the PUCCH repetition factor. The PUCCH repetition factor is in effect during the valid time. After the time interval is lapsed, the UE can stop repeating the PUCCH. For example, the predetermined time interval may include a predetermined number of slots or mini-slots. In one aspect, the PRF can remain valid until the UE receives another or next PUCCH repetition indication that can change (e.g., increase, decrease, or stop) or cancel the PUCCH repetition factor.

Figure 8:
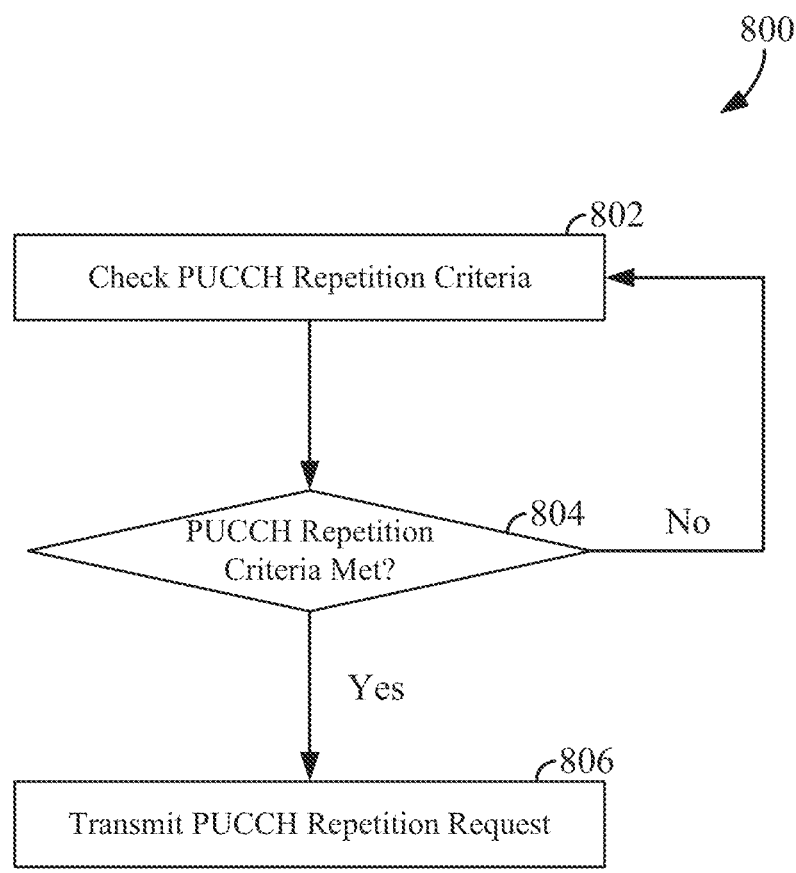
FIG. 8 is a flow chart illustrating a process for transmitting a request for a PUCCH repetition factor according to some aspects.

FIG. 8 is a flow chart illustrating a process 800 for transmitting a request for a PUCCH repetition factor according to some aspects. In one example, a UE (e.g., UE 604) can use the process 800 to determine whether or not to transmit a repetition request (e.g., PUCCH repetition request 620) to a base station (e.g., base station 602).

At block 802, a UE can check one or more PUCCH repetition criteria to determine whether or not to transmit a PUCCH repetition request. In one aspect, the PUCCH repetition criteria can include UL and/or DL channel quality between the UE and the base station. For example, the channel quality may include a signal-to-noise ratio (SNR), a signal-to-interference plus noise ratio (SINR), and/or a signal-to-noise plus distortion ratio (SNDR) of the communication channel between the UE and the base station. In one aspect, the PUCCH repetition criteria can include historical data on the communication between the UE and the base station. For example, the historical data can indicate the communication failure, if any, occurred between the UE and the base station during a predetermined time interval. A high rate of communication failure can indicate a poor, unstable, or undesirable channel quality, and vice versa. In some aspects, the base station can provide the PUCCH repetition criteria to the UE, for example, using RRC signaling, DCI, and/or MAC CE.

At decision block 804, the UE can determine whether one or more of the PUCCH repetition criteria are met. In one example, a PUCCH repetition criterion is met when the channel quality (e.g., SNR, SINR, and/or SNDR) is below a predetermined threshold. In one example, a PUCCH repetition criterion is met when the historical data indicates a high rate of communication failure between the UE and the base station. For example, if the UE failed to transmit HARQ feedback to the base station, it can meet the PUCCH repetition criterion.

At block 806, the UE can transmit a PUCCH repetition request (e.g., request 620) to the base station when one or more PUCCH repetition criteria are met (i.e., YES path from the decision block 804). The PUCCH repetition request can cause the base station to transmit a PUCCH repetition indication to the UE as described above in relation to FIG. 6. In some aspects, the PUCCH repetition criteria can include a condition of the communication between the UE and the base station. For example, the condition may include the SNR, SINR, and/or SNDR of the communication channel between the UE and the base station. In this case, the condition of PUCCH repetition criteria is met when any of the SNR, SINR, and/or SNDR is below a predetermined threshold.

Implicit Repetition Factor Indication for PUCCH

Figure 9:
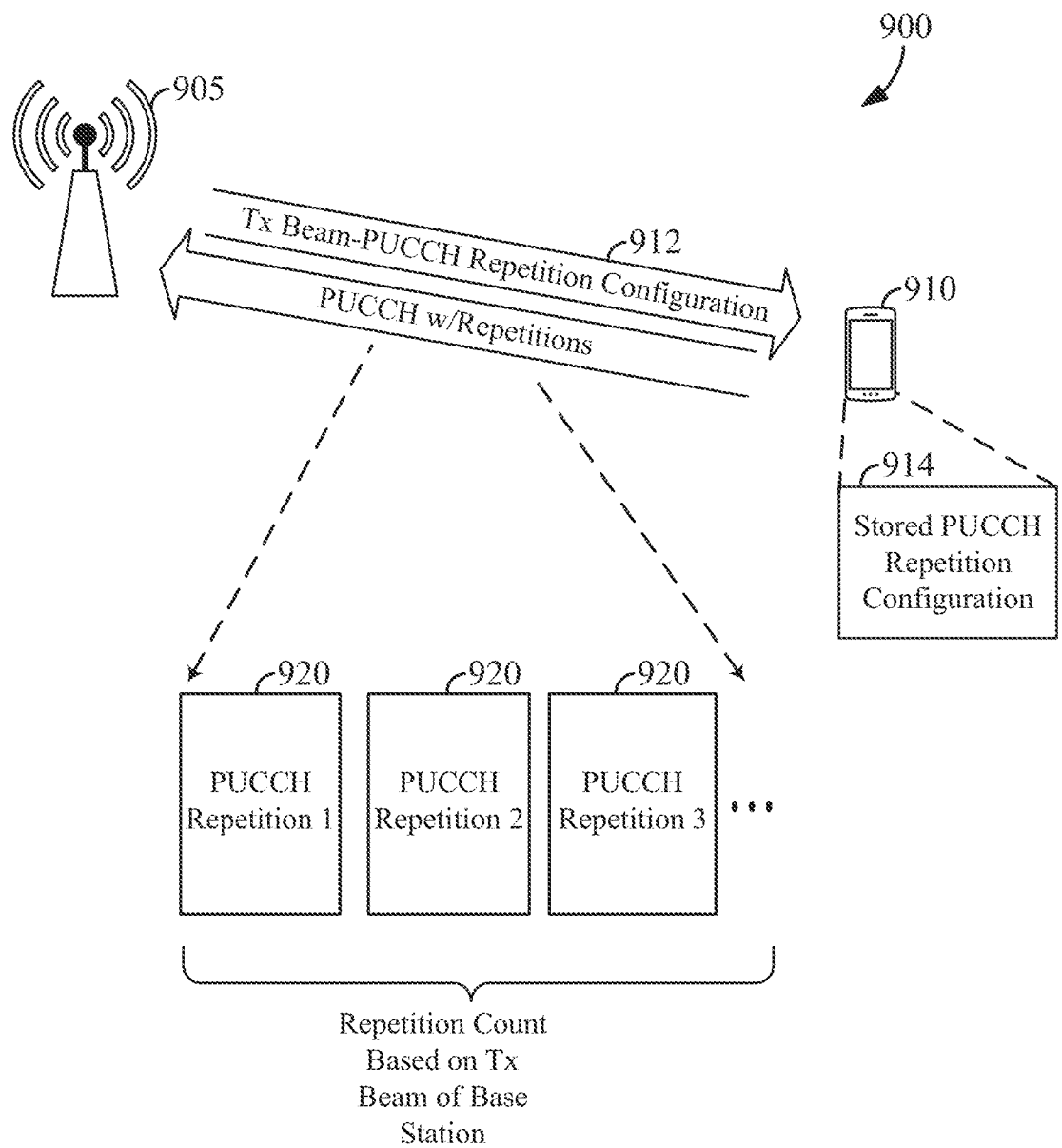
FIG. 9 is a diagram illustrating a process of implicitly indicating a PUCCH repetition factor according to some aspects.

FIG. 9 illustrates an example of implicit indication of a repetition factor for an uplink control channel according to some aspects. A wireless network 900 may implement aspects of the RAN 200. The wireless network 900 may include a base station 905 and/or UE 910, which may be examples of the corresponding devices described herein.

The wireless network 900 may support various PUCCH enhancement techniques for coverage enhancements. In some aspects, the wireless network 900 may use signaling mechanisms that support DMRS bundling across PUCCH repetitions, and as well as certain coverage enhancements. Some wireless networks may use a group-common DCI to indicate PUCCH coverage enhancements, such as preconfigured PUCCH repetition. However, such a mechanism cannot dynamically indicate the repetition factor for PUCCH transmissions with repetition. The repetition factor many indicate a number, count, or quantity of repetitions of a PUCCH transmission or the like, where the same PUCCH transmission (e.g., an instance or occurrence of a single PUCCH message) may be transmitted one or more times according to the repetition factor (e.g., a repetition count).

Aspects of the described techniques may provide a mechanism to implicitly indicate a correspondence or mapping between each of the available transmit beams of a base station 905 to a repetition factor (e.g., the repetition count) for an uplink control channel (e.g., PUCCH). That is, the base station 905 may be performing wireless communications with a UE 910 using one or more transmit beams (e.g., beams described in FIG. 5). The transmit beam, in this context, may generally refer to any beam/transmission performed in a directional manner, which may correspond to a particular transmit beam (e.g., based on a beam index or other identifier), antenna configuration, antenna port, antenna array, and the like. In some aspects, each transmit beam of the base station 905 may be uniquely identified or otherwise associated with an identifiable feature and/or parameter (e.g., transmission configuration indicator (TCI) configuration, part of a resource configuration, etc.).

The base station 905 may transmit or otherwise provide (and the UE 910 may receive or otherwise obtain) a configuration signal identifying or otherwise indicating the correspondence between the transmit beams of the base station 905 and certain PUCCH repetition factors. For example, the base station 905 may transmit the configuration (e.g., Tx Beam-PUCCH repetition configuration 912) to indicate the correspondence or mapping to the UE 910 using RRC signaling, upper layer signaling (e.g., L3 signaling), MAC CE signaling, and the like. For example, the configuration may generally map each transmit beam of the base station 905 to a corresponding repetition factor for PUCCH transmissions. For example, each transmit beam of the base station 905 may be mapped to a unique or different repetition factor for PUCCH transmissions (e.g., uplink control message) with repetition. In another example, a subset or group of transmit beams of the base station 905 may each be mapped to a unique repetition factor for PUCCH repetition. The configuration 912 may be indicated initially (e.g., upon the UE 910 establishing a connection with the base station 905 during a connection establishment/reestablishment/update procedure) and/or may be updated by the base station 905 (e.g., according to a periodic schedule, an aperiodic schedule, and/or as-needed). Accordingly, the association or correspondence of the transmit beam (or TCI state) and the PUCCH repetition factor may be changed dynamically using a downlink MAC CE, DCI, and the like. The UE 910 may store or otherwise maintain the correspondence between the transmit beams of the base station 905 and the PUCCH repetition factors (e.g., store in memory, in a look-up table 914, etc.). The configuration indicating the correspondence may map one or more of the transmit beams of the base station 905 to two or more repetition counts and, in some situations, one or more of the transmit beams of the base station 905 to one repetition factor (e.g., one or more transmit beams of the base station 905 may be mapped to no repetition).

Accordingly, the UE 910 may identify or otherwise determine that it has a first uplink control message (e.g., a PUCCH message) for transmission with repetition. For example, UE 910 may determine that it has an uplink control message transmission with repetition based on receiving a downlink shared channel transmission (e.g., a PDSCH message) where the first uplink control message may be used to provide HARQ-ACK feedback (e.g., a feedback message). In another example, the UE 910 may determine that it has an uplink control message transmission with repetition based on a buffer-status of the UE 910 (e.g., based on having for transmission a buffer status report (BSR), scheduling request (SR), and the like). In another example, the UE 910 may determine that it has an uplink control message transmission with repetition based on channel status information (CSI) feedback to provide to the base station 905. Other examples of uplink control information/data may also be the basis for the first uplink control message transmission with repetition.

Based on the first uplink control message, the base station 905 and/or UE 910 may identify, select, or otherwise implicitly determine a first repetition factor for the first uplink control message based on the active transmit beam or transmission configuration indicator state (e.g., TCI state) of the base station 905. For example, the active transmit beam of the base station 905 may include a transmit beam of one or more transmit beams of the base station 905. The base station 905 and/or UE 910 may use the configuration 914 (e.g., a look-up table), which indicates the correspondence between the transmit beams of the base station 905 to the repetition factor for uplink control channel transmissions with repetition, to identify the first repetition factor for the first uplink control message. That is, the base station 905 and/or UE 910 may use the correspondence or mapping to determine, based on the active transmit beam of the base station 905, the corresponding first repetition factor, and therefore the corresponding first repetition count for transmitting the repetitions of the first uplink control message. Accordingly, the UE 910 may transmit or otherwise provide (and base station 905 may receive or otherwise obtain) repetitions of the first uplink control message as indicated by the first repetition factor. For example, the UE 910 may transmit the three repetitions 920 of the first uplink control message corresponding to the first repetition count. In other examples, the repetition count may be one, two, or four or more.

Accordingly, aspects of the described techniques may provide for the base station 905 and/or UE 910 to know, identify, or otherwise determine the active transmit beam of base station 905 in order to implicitly identify the associated repetition factor. As discussed above, each transmit beam of base station 905 may correspond to a beam index, antenna configuration, antenna port, transmission direction, and the like. The transmit beam may be based on various configurations/parameters, such as TCI state, resource configuration, etc.

In one example, the active transmit beam of the base station 905 may be the current (active) control beam of the base station 905. For example, the active control beam of the base station 905 may be considered the active transmit beam for repetition factor determination. In one example, the active control beam of the base station 905 may correspond to the transmit beam used for control message transmissions from the base station 905 (e.g., PDCCH transmissions). Accordingly, in one example, the PUCCH repetition factor may be associated to the current control beam of the base station 905.

In another example, the active transmit beam of the base station 950 may be based on a PDSCH transmission. For example, the base station 905 may allocate or otherwise schedule a downlink shared channel (e.g., PDSCH) transmission to the UE 910. The downlink shared channel transmission may be configured with an acknowledgement mode (e.g., with HARQ-ACK feedback) such that the UE 910 is expected to provide a feedback message (e.g., ACK or NACK) indicating whether the UE 910 was able to receive and decode the downlink shared channel transmission. In this example, the transmit beam used for the downlink shared channel transmission may be the active transmit beam of the base station 905 for the purpose of repetition factor determination. That is, the base station 905 and/or UE 910 may determine which transmit beam the base station 905 used to perform the downlink shared channel transmission, access the configuration indicating the correspondence between that transmit beam and the corresponding repetition factor, and use this correspondence to determine the repetition count for transmitting the feedback message with repetition. Accordingly, the repetition factor for a PUCCH transmission carrying ACK/NACK information may be associated with the beam or TCI state (e.g., beam configuration) of the associated PDSCH or downlink message.

As discussed above, in some instances the active transmit beam of the base station 950 may be based on, or otherwise identified using a TCI state, resource configuration, etc. For example, the base station 905 may configure various TCI states configurations within higher layer signaling (e.g., RRC signaling), which may be used by the UE 910 to decode PDSCH transmissions. The active transmit beam of the base station 905 may be determined or otherwise identified based on the TCI state configured for the UE 910.

In some examples, the active transmit beam of the base station 905 may be identified or otherwise determined based on a quasi-colocation (QCL) relationship. For example, the base station 905 may transmit a DCI message to the UE 910 configuring various parameters, such as a QCL relationship between downlink reference signals in one CSI-RS set and the PDSCH DMRS ports. The QCL relationship may identify two antenna ports that are considered quasi-colocated if the properties of the channel over which a symbol on one antenna port can be inferred from the channel over which a symbol on the other antenna port is conveyed. Accordingly, the base station 905 and/or UE 910 may identify a second transmit beam of the base station 905. The second transmit beam may be used for various signals transmitted by the base station 905. For example, the second transmit beam of the base station 905 may be used for transmission of broadcast transmissions (e.g., SSB transmissions), synchronization signal transmissions (e.g., PSS/SSS, such as PSS/SSS of an SSB), reference signal transmissions (e.g., CSI-RS), tracking signal transmissions (position tracking signals, location tracking signals, etc.), and the like. The base station 905 and/or UE 910 may identify or otherwise determine the active transmit beam of the base station 905 based on the QCL relationship between the second transmit beam and the active transmit beam to identify or otherwise determine the active transmit beam.

In some examples, the base station 905 may dynamically override the correspondence between one or more transmit beams of the base station 905 and their corresponding repetition factors. That is, the base station 905 may transmit or otherwise provide (and UE 910 may receive or otherwise obtain) an indication to override the correspondence for the active transmit beam of the base station 905 from the first repetition factor to an updated repetition factor, which is associated with an updated repetition count. Accordingly, the UE 910 may use the updated repetition count for transmitting the repetitions of the first uplink control message based on the overriding indication. In some examples, the dynamic override indication may be signaled using DCI signaling, MAC CE signaling, etc.

Accordingly, the UE 910 may transmit or otherwise provide (and the base station 905 may receive or otherwise obtain) repetitions of the first uplink control message based on the first (or updated) repetition factor/count. The PUCCH repetitions may be transmitted using inter-slot repetition and/or intra-slot repetition. The above described techniques can enable the base station 905 to implicitly indicate the PUCCH repetition factor to the UE 910 via beam selection (e.g., by associating a beam with a PUCCH repetition factor).

Figure 10:
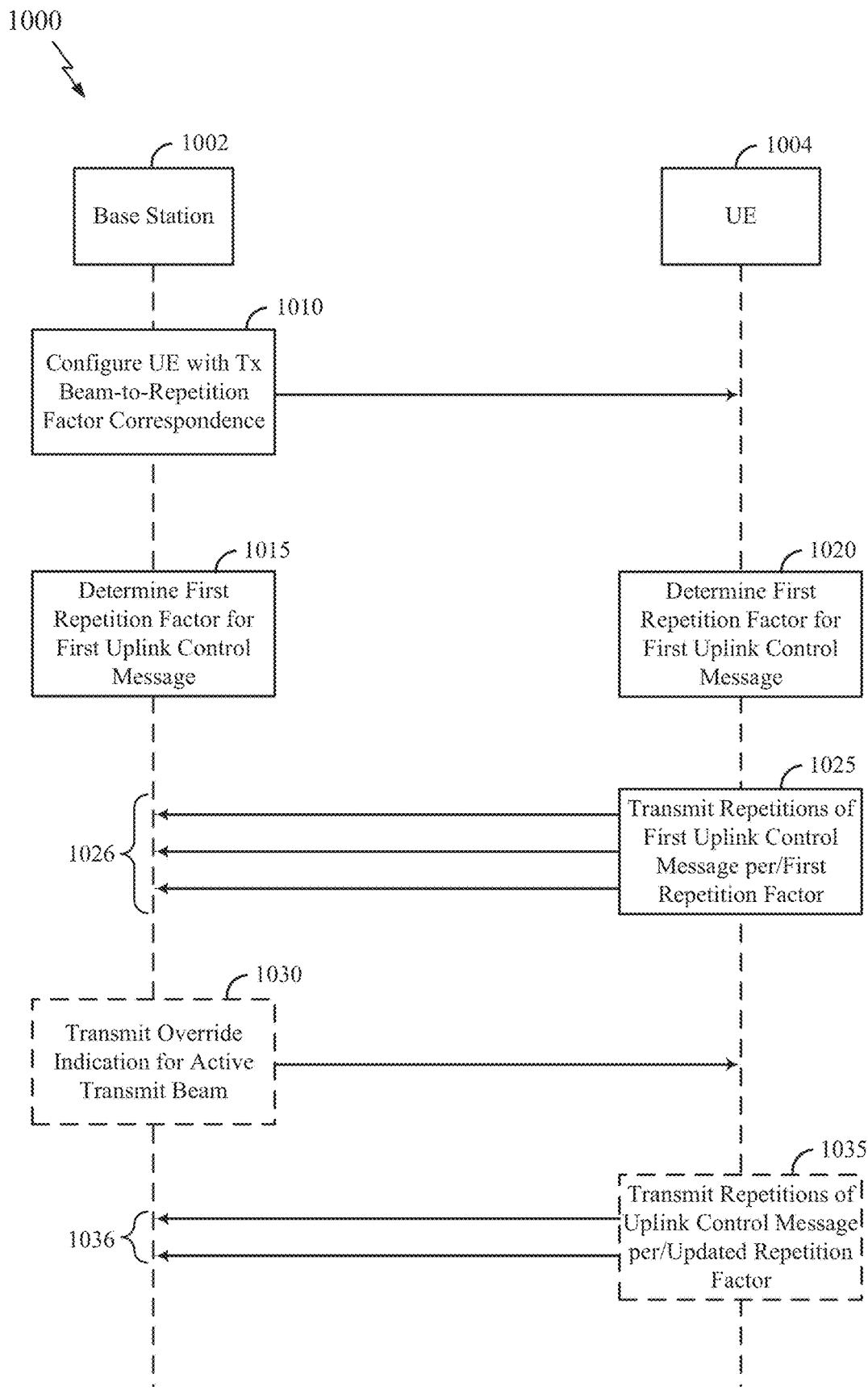
FIG. 10 is a diagram illustrating an exemplary process of implicitly indicating a PUCCH repetition factor according to some aspects.

FIG. 10 illustrates an exemplary process 1000 that supports implicit indication of a repetition factor for an uplink control channel in accordance with aspects of the present disclosure. Process 1000 may be implemented at or by the wireless network 200. Aspects of process 1000 may be implemented by a base station 1002 and/or a UE 1004, which may be examples of the corresponding devices described herein.

At 1010, the base station 1002 may transmit or otherwise provide (and the UE 1004 may receive or otherwise obtain) a configuration indicating a correspondence between one or more transmit beams of the base station 1002 and the repetition factor for an uplink control channel (e.g., PUCCH) transmission. In some aspects, the repetition factor may identify or otherwise indicate a repetition count for transmitting repetitions of uplink control messages on the uplink control channel (e.g., PUCCH). In some aspects, the base station 1002 may transmit the configuration 1010 indicating the correspondence via upper layer signaling, RRC signaling, etc. In some aspects, the configuration may indicate a correspondence between one or more of the transmit beams of the base station 1002 and a repetition count of one (e.g., no repetition). In some aspects, the configuration may indicate a correspondence between one or more of the transmit beams of the base station 1002 and a repetition count of two or more repetitions. In one example, the base station 1002 may configure a first subset of transmit beams with repetition counts of two or more repetitions and a second subset of transmit beams with repetition counts of one (which may be referred to as no repetition in some examples). Accordingly, the configured correspondence may map the transmit beam(s) of the base station 1002 to one or more repetition counts for PUCCH transmission with repetition.

At 1015, the base station 1002 may identify or otherwise determine, according to the correspondence, a first repetition factor for a first uplink control message from the UE 1004 based on the active transmit beam of the base station 1002 from one or more transmit beams. For example, the base station 1002 may identify the active transmit beam based on the TCI state configuration provided to the UE 1004, a QCL relationship between a broadcast beam, a synchronization signal beam, a tracking signal beam, a reference signal beam, etc., and the active transmit beam. In some aspects, the base station 1002 may identify or otherwise determine the active transmit beam based on the current control beam being used by the base station 1002.

At 1020, the UE 1004 may identify or otherwise determine, according to the correspondence, a first repetition factor for a first uplink control message to the base station 1002 based on the active transmit beam of the base station 1002. For example, the UE 1004 may identify the active transmit beam at the base station 1002 based on a TCI state configuration provided by the base station 1002, a QCL relationship between a broadcast beam, a synchronization signal beam, a reference signal beam, a tracking signal beam, etc., and the active transmit beam. In some examples, this may include the UE 1004 identifying or otherwise determining the active transmit beam based on the current control beam being used by the base station 1002.

At 1025, the UE 1004 may transmit or otherwise provide (and the base station 1002 may receive or otherwise obtain) repetitions of the first uplink control message (e.g., UCI/PUCCH) as indicated by the first repetition factor, with three repetitions 1026 being shown by way of example only. For example, the UE 1004 may transmit the repetitions of the first uplink control message (e.g., PUCCH), with the number of repetitions transmitted corresponding to the first repetition factor (e.g., the first repetition count) that is based on the active transmit beam of the base station 1002. In some aspects, the repetitions of the first uplink control message may be transmitted using intra-slot repetitions and/or inter-slot repetitions.

At 1030, the base station 1002 may optionally transmit or otherwise provide (and UE 1004 may receive or otherwise obtain) an indication to override the correspondence of the active transmit beam of the base station 1002 from the first repetition factor to an updated repetition factor. Generally, the updated repetition factor (e.g., a second repetition factor) may have a different repetition count than the first repetition factor. That is, the updated repetition factor may indicate or otherwise be associated with an updated repetition count that is different than the first repetition count associated with the first repetition factor.

Accordingly, at 1035, the UE 1004 may optionally transmit or otherwise provide (and the base station 1002 may receive or otherwise obtain) the repetitions of the first uplink control message and/or a second uplink control message to the base station 1002 according to the updated repetition factor, with two exemplary repetitions 1036 being shown by way of example only. That is, the override indication 1030 may provide a mechanism where the base station 1002 may dynamically (e.g., using an indication in DCI signaling, a MAC CE, etc.) change or update the correspondence between the transmit beams of the base station 1002 and the repetition factor for uplink control messages transmitted via the uplink control channel with repetition.

Repetition Factor Interpretation Based on PUCCH Parameter

In some aspects, a PUCCH repetition factor or indication may be applied or interpreted differently depending on a PUCCH repetition parameter. The PUCCH repetition factor may be indicated explicitly or implicitly, for example, using the methods described above in FIGS. 6-10. In some aspects, the PUCCH parameter may include a PUCCH format, a UCI size, a PUCCH resource set, and/or a code rate of a PUCCH transmission. By dynamically indicating the PUCCH repetition factor, configuration for PUCCH repetition may be adapted to improve the chances of receiving PUCCH repetitions. As a result, some aspects of the techniques and apparatuses described herein may positively impact network performance.

In some aspects, a UE can determine or select a PUCCH resource set from one or more (e.g., up to 4) configured PUCCH resource sets based on the UCI payload size (e.g., not including a cyclic redundancy check (CRC)). Each PUCCH resource set includes certain communication resources (e.g., time and frequency resources or RBs 308) that can be used for PUCCH transmissions. In some cases, the selection of a PUCCH resource set may be based on a comparison between the UCI payload size ($O_{UCI}$) and a threshold associated with each PUCCH resource set. The PUCCH resource sets may have different thresholds. For example, the threshold for PUCCH resource set 0 may be 2 bits, which means that the UE can select PUCCH resource set 0 for 1-bit or 2-bit $O_{UCI}$. For $O_{UCI}>2$, the UE can select a PUCCH resource set with a higher threshold (e.g., greater than 2 bits).

In one example, PUCCH resource sets 1, 2, and 3 may each be separately configured with a threshold (e.g., up to 1706 bits, a limit chosen for the coding chain to ensure good performance). If the threshold parameter for a PUCCH resource set (1, 2, or 3) is not configured, the threshold can be assumed to be 1706, which means the PUCCH resource set can support up to 1706 bits. A UE with $O_{UCI}>2$ may sequentially compare $O_{UCI}$ and the thresholds for PUCCH format set 1, 2, and 3, respectively, and determine the appropriate PUCCH resource set for a PUCCH transmission.

Figure 11:
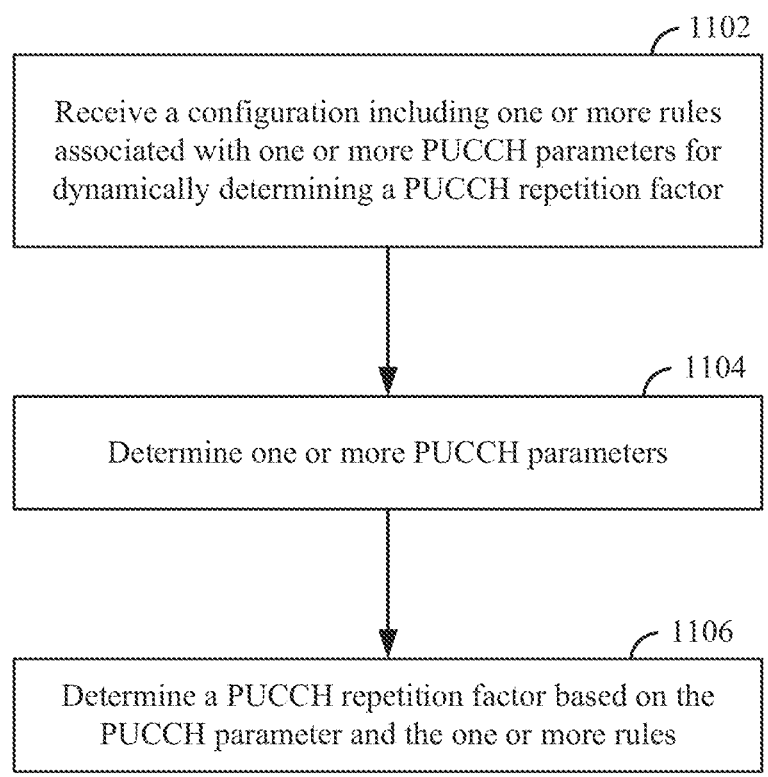
FIG. 11 is a diagram illustrating a process for dynamic indication of a PUCCH repetition factor according to some aspects.

FIG. 11 is a diagram illustrating a process 1100 associated with dynamic indication of a PUCCH repetition factor in accordance with some aspects of the present disclosure. For example, the process 1100 may be used between a base station and a UE to interpret a PUCCH repetition factor or indication that can be explicitly or implicitly indicated as described above in relation to FIGS. 6-10.

At block 1102, a UE may receive from a base station a configuration including one or more rules associated with one or more PUCCH parameters for dynamically determining or interpreting a PUCCH repetition factor indication. For example, the UE can receive a radio resource control (RRC) message that provides the configuration (e.g., control information) for dynamic interpretation of a PUCCH repetition factor or indication as described below. In some aspects, the configuration may provide one or more rules (e.g., restrictions) associated with PUCCH formats, UCI size, PUCCH resource sets, or code rates, among other examples, for interpreting a PUCCH repetition factor indication. In some aspects, the one or more rules may be specified in a wireless communication standard (e.g., 5G NR) that governs the communication between the UE and the base station. In some aspects, the UE can use the one or more rules to dynamically determine the value of a PUCCH repetition factor that can be explicitly indicated (e.g., explicit indication as described in FIG. 6) or implicitly indicated (e.g., implicit indication as described in FIG. 10) by a base station. For example, the one or more rules may define interpretations of values associated with one or more PUCCH parameters with respect to the value of the repetition factor. In some aspects, the PUCCH parameters may include at least one of a PUCCH format, a UCI size, a PUCCH resource set, or a code rate of the PUCCH.

At block 1104, the UE may determine one or more PUCCH parameters that are currently configured at the UE. For example, the one or more PUCCH parameters can include a PUCCH format, a UCI size, a PUCCH resource set, and/or a code rate of a PUCCH transmission. At block 1106, the UE may determine a PUCCH repetition factor based on the one or more PUCCH parameters and the one or more rules for interpreting an indication of the PUCCH repetition factor that may be explicitly or implicated indicated by a base station.

In one aspect, the UE may determine the PUCCH format and determine the PUCCH repetition factor based at least in part on a rule associated with the PUCCH format (e.g., PUCCH formats 0-4). In the case that the UE has received an explicit or implicit indication of the PUCCH repetition factor from the base station, the UE can interpret the indication (e.g., a first value) based on the associated rule to arrive at a second value that becomes the actual or effective value (e.g., counts) of the PUCCH repetition factor for controlling the repetitions of PUCCH transmissions. In one aspect, the PUCCH repetition factor may be restricted to one or more PUCCH formats. For example, an indication of the PUCCH repetition factor can be valid only for (or restricted to) one or more PUCCH formats according to the configured rules. If the UE determines that the PUCCH repetition factor is not valid, the UE does not repeat the PUCCH.

In another aspect, the UE may determine the UCI size and/or a code rate for a PUCCH transmission and determine the PUCCH repetition factor based at least in part on a rule associated with the UCI size and/or code rate. For example, the UE can interpret an explicit or implicit PUCCH repetition factor indication (e.g., a first value) based on the rule associated with the UCI size and/or code rate to arrive at the actual or effective value (e.g., a second value) of the PUCCH repetition factor for controlling the repetitions of PUCCH transmissions. In one example, the indication of PUCCH repetition factor can be valid only for (or restricted to) one or more UCI sizes and/or code rates according to the configured rules. If the UE determines that the PUCCH repetition factor is not valid, the UE does not repeat the PUCCH.

In another aspect, the UE may determine the PUCCH resource set for a PUCCH transmission and determine the PUCCH repetition factor based at least in part on a rule associated with the PUCCH resource set. For example, the UE can interpret an explicit or implicit PUCCH repetition factor indication (e.g., a first value) based on the rule associated with the PUCCH resource set to arrive at the actual or effective value (e.g., a second value) of the PUCCH repetition factor for controlling the repetitions of PUCCH transmissions. In one example, the indication of PUCCH repetition factor can be valid only for (or restricted to) one or more PUCCH resource sets according to the configured rules.

After determining the PUCCH repetition factor, the UE may transmit at least one PUCCH repetition (e.g., repeated PUCCH transmissions in one or more slots) based at least in part on the dynamically determined PUCCH repetition factor, if it is valid. As described above, FIG. 11 provides an example in which a UE can dynamically determine and apply an explicitly or implicated indicated PUCCH repetition factor that can be interpreted differently based on one or more PUCCH parameters and one or more rules for interpreting the repetition factor. The rules can be preconfigured or configured by the base station.

Figure 12:
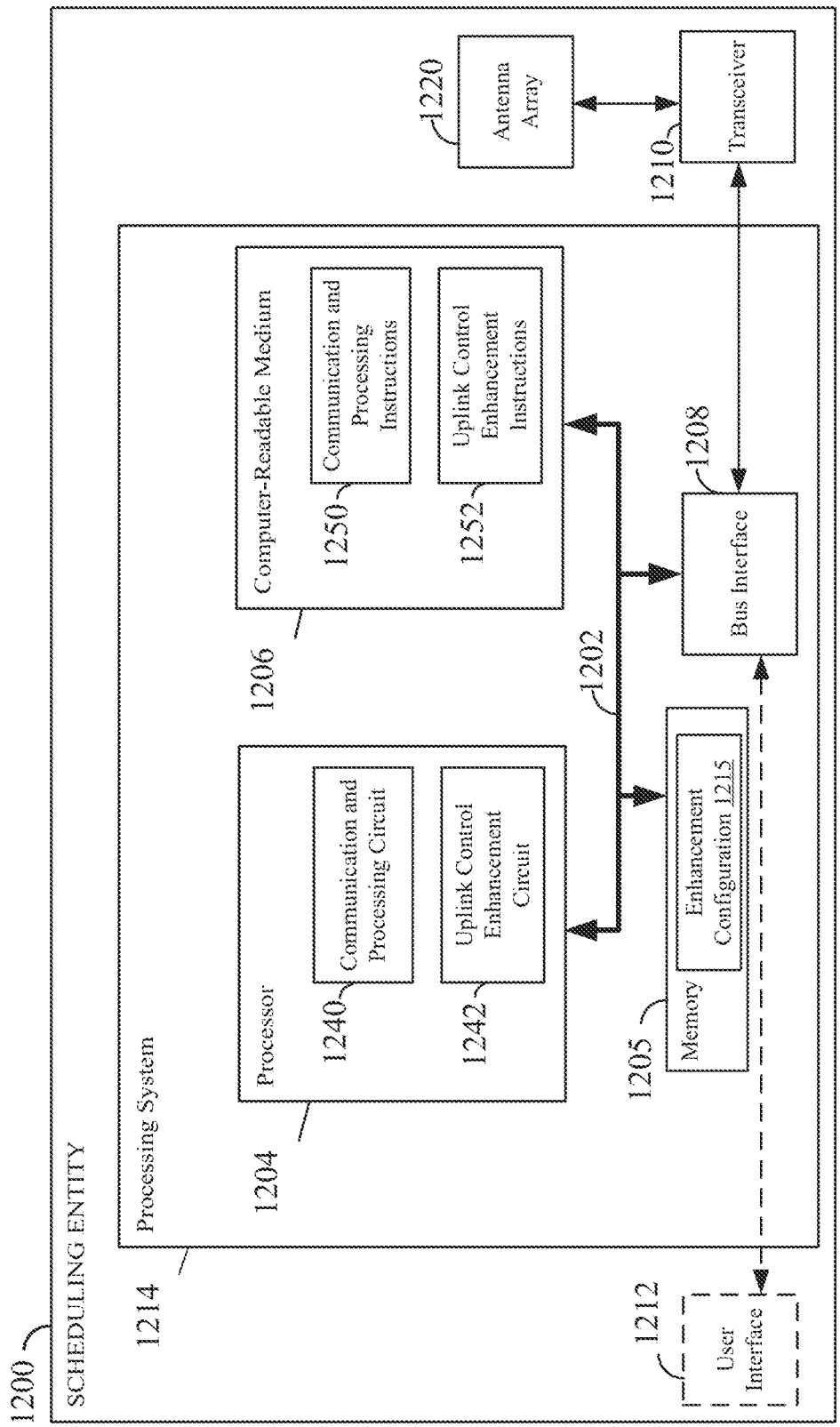
FIG. 12 is a block diagram conceptually illustrating an example of a hardware implementation for a scheduling entity according to some aspects.

FIG. 12 is a block diagram illustrating an example of a hardware implementation for a scheduling entity 1200 employing a processing system 1214. For example, the scheduling entity 1200 may be a base station, gNB, or RRH as illustrated in any one or more of FIGS. 1, 2, 5, 6, 9, and/or 10.

The scheduling entity 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1200 may be configured to perform any one or more of the functions described herein. That is, the processor 1204, as utilized in a scheduling entity 1200, may be used to implement any one or more of the processes and procedures described below and illustrated in FIG. 13.

The processor 1204 may in some instances be implemented via a baseband or modem chip and in other implementations, the processor 1204 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210. The transceiver 1210 and antenna array 1220 can provide a communication interface or means for communicating with various other apparatus over a transmission medium. Depending upon the nature of the apparatus, a user interface 1212 (e.g., keypad, display, speaker, microphone, joystick, touchscreen) may also be provided. Of course, such a user interface 1212 is optional, and may be omitted in some examples, such as a base station.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software. For example, the scheduling entity may store uplink control enhancement configuration information 1215 at the memory 1205.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206. The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1204 may include circuitry configured for various functions, including, for example, indication of a repetition factor for uplink control information. For example, the circuitry may be configured to implement one or more of the functions described below in relation to FIG. 13.

In some aspects of the disclosure, the processor 1204 may include communication and processing circuitry 1240 configured for various functions, including for example communicating with a network core (e.g., a 5G core network), scheduled entities (e.g., UE), or any other entity, such as, for example, local infrastructure or an entity communicating with the scheduling entity 1200 via the Internet, such as a network provider. In some examples, the communication and processing circuitry 1240 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1240 may include one or more transmit/receive chains. In addition, the communication and processing circuitry 1240 may be configured to receive and process uplink traffic and uplink control messages (e.g., similar to uplink traffic 116 and uplink control 118 of FIG. 1), transmit and process downlink traffic and downlink control messages (e.g., similar to downlink traffic 112 and downlink control 114). The communication and processing circuitry 1240 may further be configured to execute communication and processing software 1250 stored on the computer-readable medium 1206 to implement one or more functions described herein.

In some implementations where the communication involves receiving information, the communication and processing circuitry 1240 may obtain information from a component of the scheduling entity 1200 (e.g., from the transceiver 1210 that receives the information via radio frequency signaling or some other type of signaling suitable for the applicable communication medium), process (e.g., decode) the information, and output the processed information. For example, the communication and processing circuitry 1240 may output the information to another component of the processor 1204, to the memory 1205, or to the bus interface 1208. In some examples, the communication and processing circuitry 1240 may receive one or more of signals, messages, other information, or any combination thereof. In some examples, the communication and processing circuitry 1240 may receive information via one or more channels. In some examples, the communication and processing circuitry 1240 may include functionality for a means for receiving. In some examples, the communication and processing circuitry 1240 may include functionality for a means for processing, including a means for demodulating, a means for decoding, etc.

In some implementations where the communication involves sending (e.g., transmitting) information, the communication and processing circuitry 1240 may obtain information (e.g., from another component of the processor 1204, the memory 1205, or the bus interface 1208), process (e.g., modulate, encode, etc.) the information, and output the processed information. For example, the communication and processing circuitry 1240 may output the information to the transceiver 1210 (e.g., that transmits the information via radio frequency signaling or some other type of signaling suitable for the applicable communication medium). In some examples, the communication and processing circuitry 1240 may send one or more of signals, messages, other information, or any combination thereof. In some examples, the communication and processing circuitry 1240 may send information via one or more channels. In some examples, the communication and processing circuitry 1240 may include functionality for a means for sending (e.g., a means for transmitting). In some examples, the communication and processing circuitry 1240 may include functionality for a means for generating, including a means for modulating, a means for encoding, etc.

In some aspects of the disclosure, the processor 1204 may include uplink control enhancement circuitry 1242 configured for various functions, for example, uplink control channel coverage enhancement as described herein. The uplink control enhancement circuitry 1242 can be configured to manage and provide configuration or control information for repetitions of uplink control information transmissions (e.g., UCI/PUCCH transmissions). In one aspect, the uplink control enhancement circuitry 1242 together with the communication and processing circuitry 1240 can be configured to explicitly indicate a repetition factor for uplink control information (e.g., PUCCH), for example, as described above in relation to FIGS. 6-8. In one aspect, the uplink control enhancement circuitry 1242 together with the communication and processing circuitry 1240 can be configured to implicitly indicate a repetition factor for uplink control information (e.g., PUCCH), for example, as described above in relation to FIGS. 9-10. In one aspect, the uplink control enhancement circuitry 1242 together with the communication and processing circuitry 1240 can be configured to dynamically indicate a repetition factor for uplink control information (e.g., PUCCH) that can be interpreted differently according to one or more PUCCH parameters, for example, as described above in relation to FIG. 11. The uplink control enhancement circuitry 1242 may further be configured to execute uplink control enhancement software 1252 stored on the computer-readable medium 1206 to implement one or more functions described herein.

In one configuration, the apparatus 1200 for wireless communication includes means for configuring, controlling, and receiving repetitions of uplink control information. In one aspect, the aforementioned means may be the processor 1204 shown in FIG. 1200 configured to perform the functions recited by the aforementioned means. In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1, 2, 4-6, 9, and/or 10, and utilizing, for example, the processes and/or algorithms described herein in relation to FIGS. 6-8, 10, and/or 11.

Figure 13:
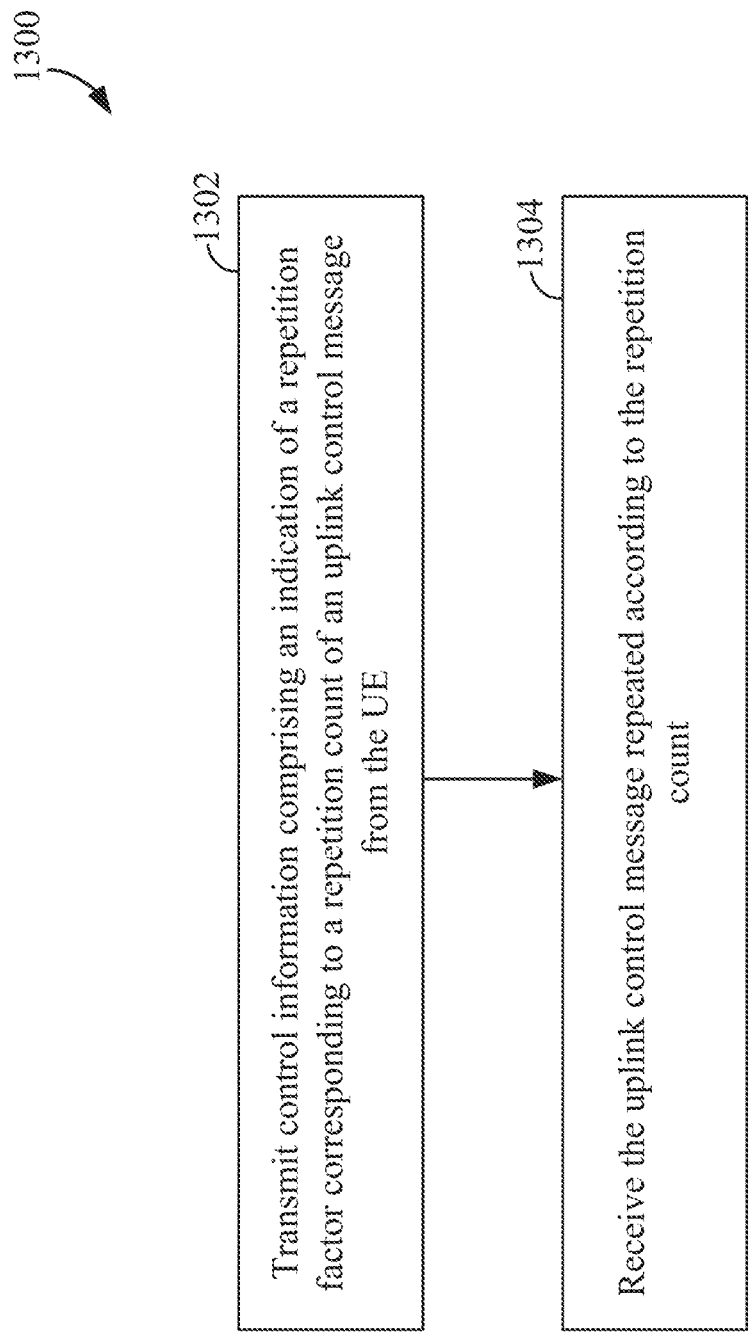
FIG. 13 is a flow chart illustrating an exemplary process for receiving repetitions of an uplink control message according to some aspects.

FIG. 13 is a flow chart illustrating an exemplary process 1300 for receiving repetitions of an uplink control message in accordance with some aspects of the present disclosure. As described below, some or all illustrated features may be omitted in a particular implementation within the scope of the present disclosure, and some illustrated features may not be required for the implementation of all examples. In some examples, the process 1300 may be carried out by the base station 1200 illustrated in FIG. 12. In some examples, the process 1300 may be carried out by any suitable apparatus or means for carrying out the functions or algorithm described below.

At block 1302, a base station (e.g., a gNB or scheduling entity) can transmit control information to a UE. For example, the control information can include an indication of a repetition factor (e.g., PUCCH repetition factor) corresponding to a repetition count of an uplink control message (e.g., PUCCH repetitions 612 or 920) from the UE. In one aspect, the uplink control enhancement circuitry 1242 can provide a means to determine and provide the control information. The control information enables the base station to explicitly or implicitly indicate the repetition factor to the UE. In one aspect, the communication and processing circuitry 1240 (see FIG. 12) can provide a means to transmit the control information to the UE via the transceiver 1210 and antenna array 1220.

In one aspect, the control information can include an explicit indication of the repetition factor for repeating the uplink control message. The explicit indication can indicate the actual number or count of repetitions. For example, the indication may include a bit string that indicates a value of the PUCCH repetition factor or an index value for identifying a PUCCH repetition factor among a plurality of predefined PUCCH repetition factors (e.g., table 700). In one example, the explicit indication of the PUCCH repetition factor may be carried in a DCI or MAC CE. The UE, in response to the control information, can transmit repetitions of a PUCCH transmission according to the PUCCH repetition factor to enhance the coverage and/or quality of the PUCCH.

In one aspect, the control information can enable the implicit indication of the repetition factor, for example, for a PUCCH. For example, the control information can provide a configuration that indicates a correspondence between each of one or more transmit beams of the base station to one or more repetition factors of the uplink control message. In one example, the UE can determine or select the repetition factor based on, at least in part, the current or active transmit beam, a TCI state, a control beam, or another beam related to the active transmit beam of the base station. In one example, the base station may transmit the configuration indicating the correspondence via upper layer signaling, RRC signaling, semi-persistent signaling, etc.

In some aspects, the control information can include a configuration that indicates one or more rules (e.g., restrictions) associated with one or more PUCCH parameters for dynamically determining the repetition factor. For example, the configuration may indicate one or more rules associated with PUCCH formats, UCI size, PUCCH resource sets, or code rates, among other examples. The UE can use the rules to dynamically determine a PUCCH repetition factor based on an interpretation of a repetition indication according to the rules and one or more PUCCH parameters.

At block 1304, the base station can receive the uplink control message repeated according to the repetition count. For example, the base station can receive a plurality of PUCCH transmissions (uplink control message) that are repeated according to the PUCCH repetition factor. In one aspect, the communication and processing circuitry 1240 can provide a means to receive the uplink control message from the UE. In some aspects, the base station can receive repetitions of the uplink control message (e.g., 2 or more repetitions of a PUCCH transmission) using the same communication resources. In some aspects, the base station can receive different transmissions of the repeated PUCCH transmissions using different communication resources.

Figure 14:
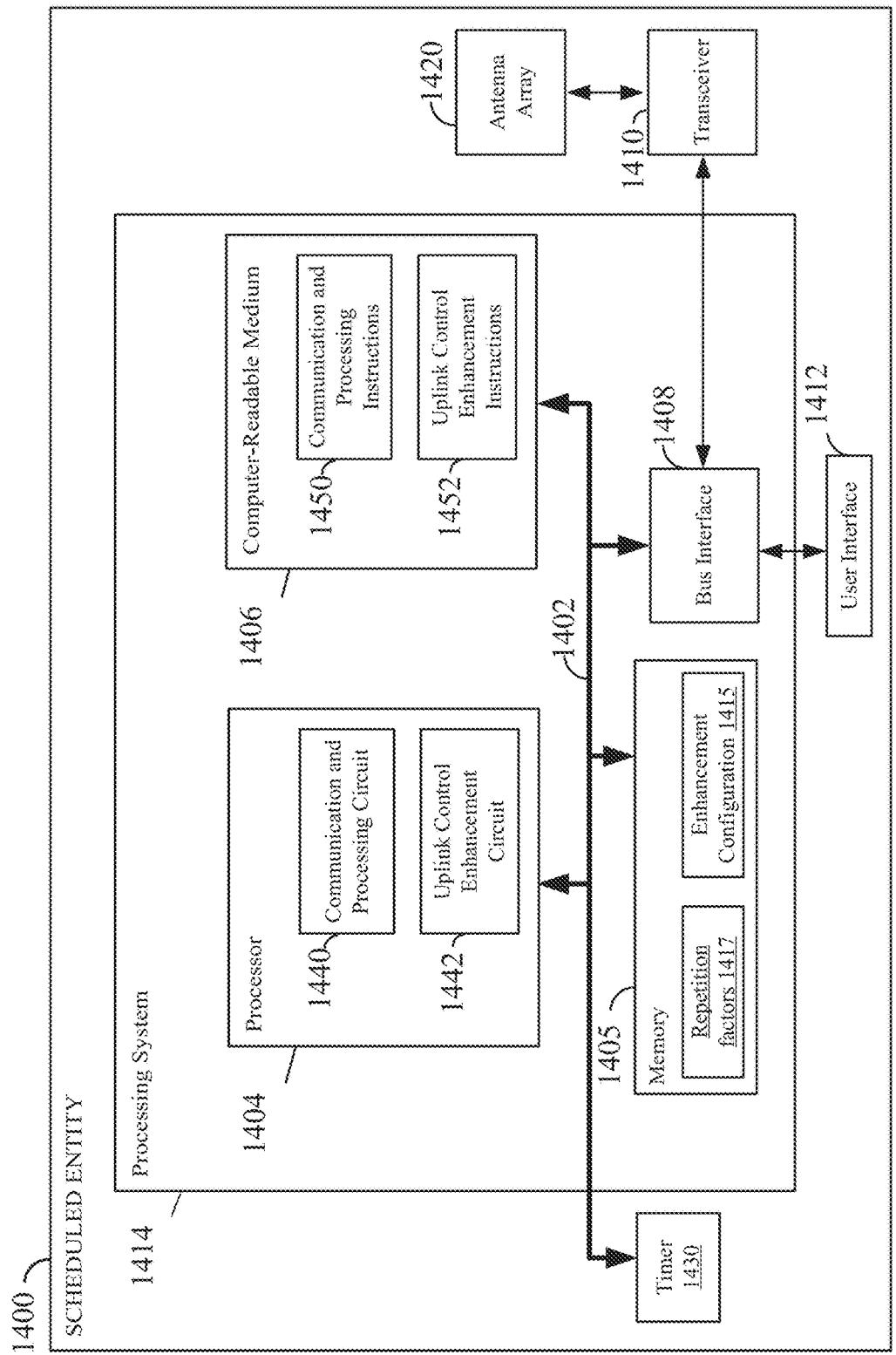
FIG. 14 is a block diagram conceptually illustrating an example of a hardware implementation for a scheduled entity according to some aspects.

FIG. 14 is a conceptual diagram illustrating an example of a hardware implementation for an exemplary scheduled entity 1400 employing a processing system 1414. In accordance with various aspects of the disclosure, an element, or any portion of an element, or any combination of elements may be implemented with a processing system 1414 that includes one or more processors 1404. For example, the scheduled entity 1400 may be a user equipment (UE) as illustrated in any one or more of FIGS. 1, 2, 4-6, 9, and/or 10.

The processing system 1414 may be substantially the same as the processing system 1214 illustrated in FIG. 12, including a bus interface 1408, a bus 1402, memory 1405, a processor 1404, and a computer-readable medium 1406. Furthermore, the scheduled entity 1400 may include a user interface 1412, a transceiver 1410, and an antenna array 1420 substantially similar to those described above in FIG. 12. That is, the processor 1404, as utilized in a scheduled entity 1400, may be used to implement any one or more of the processes described below and illustrated in FIG. 15.

In some aspects of the disclosure, the processor 1404 may include communication and processing circuitry 1440 configured for various functions, including for example communicating with a base station (e.g., scheduling entity 1200). In some examples, the communication and processing circuitry 1440 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1440 may include one or more transmit/receive chains. In addition, the communication and processing circuitry 1440 may be configured to transmit and process uplink traffic and uplink control messages (e.g., similar to uplink traffic 116 and uplink control 118 of FIG. 1), receive and process downlink traffic and downlink control messages (e.g., similar to downlink traffic 112 and downlink control 114). The communication and processing circuitry 1440 may further be configured to execute communication and processing software 1450 stored on the computer-readable medium 1406 to implement one or more functions described herein.

In some implementations where the communication involves receiving information, the communication and processing circuitry 1440 may obtain information from a component of the scheduled entity 1400 (e.g., from the transceiver 1410 that receives the information via radio frequency signaling or some other type of signaling suitable for the applicable communication medium), process (e.g., decode) the information, and output the processed information. For example, the communication and processing circuitry 1440 may output the information to another component of the processor 1404, to the memory 1405, or to the bus interface 1408. In some examples, the communication and processing circuitry 1440 may receive one or more of signals, messages, other information, or any combination thereof. In some examples, the communication and processing circuitry 1440 may receive information via one or more channels. In some examples, the communication and processing circuitry 1440 may include functionality for a means for receiving. In some examples, the communication and processing circuitry 1440 may include functionality for a means for processing, including a means for demodulating, a means for decoding, etc.

In some implementations where the communication involves sending (e.g., transmitting) information, the communication and processing circuitry 1440 may obtain information (e.g., from another component of the processor 1404, the memory 1405, or the bus interface 1408), process (e.g., modulate, encode, etc.) the information, and output the processed information. For example, the communication and processing circuitry 1440 may output the information to the transceiver 1410 (e.g., that transmits the information via radio frequency signaling or some other type of signaling suitable for the applicable communication medium) using the antenna array 1420. In some examples, the communication and processing circuitry 1440 may send one or more of signals, messages, other information, or any combination thereof. In some examples, the communication and processing circuitry 1440 may send information via one or more channels. In some examples, the communication and processing circuitry 1440 may include functionality for a means for sending (e.g., a means for transmitting). In some examples, the communication and processing circuitry 1440 may include functionality for a means for generating, including a means for modulating, a means for encoding, etc.

In some aspects of the disclosure, the processor 1404 may include uplink control enhancement circuitry 1442 configured for various functions, for example, uplink control channel coverage enhancement as described herein. The uplink control enhancement circuitry 1442 can be configured to receive and process configuration or control information for repetitions of uplink control information transmissions (e.g., UCI/PUCCH transmissions). In one aspect, the uplink control enhancement circuitry 1442 together with the communication and processing circuitry 1440 can be configured to determine an explicitly indicted repetition factor for uplink control information (e.g., PUCCH), for example, as described above in relation to FIGS. 6-8. In one aspect, the uplink control enhancement circuitry 1442 together with the communication and processing circuitry 1440 can be configured to determine an implicitly indicated repetition factor for uplink control information (e.g., PUCCH), for example, as described above in relation to FIGS. 9-10. In one aspect, the uplink control enhancement circuitry 1442 together with the communication and processing circuitry 1440 can be configured to dynamically determine a repetition factor for uplink control information (e.g., PUCCH), for example, as described above in relation to FIG. 11. For example, the uplink control enhancement circuitry 1442 can interpret a repetition factor indicator to determine a value of the repetition factor based on one or more rules associated with one or more PUCCH parameters. The uplink control enhancement circuitry 1442 may further be configured to execute uplink control enhancement software 1452 stored on the computer-readable medium 1406 to implement one or more functions described herein.

In one configuration, the apparatus 1400 for wireless communication includes means for providing and transmitting repetitions of uplink control information. In one aspect, the aforementioned means may be the processor 1404 shown in FIG. 1400 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1, 2, 4, 5, 6, 9, and/or 10, and utilizing, for example, the processes and/or algorithms described herein in relation to FIGS. 6-11.

Figure 15:
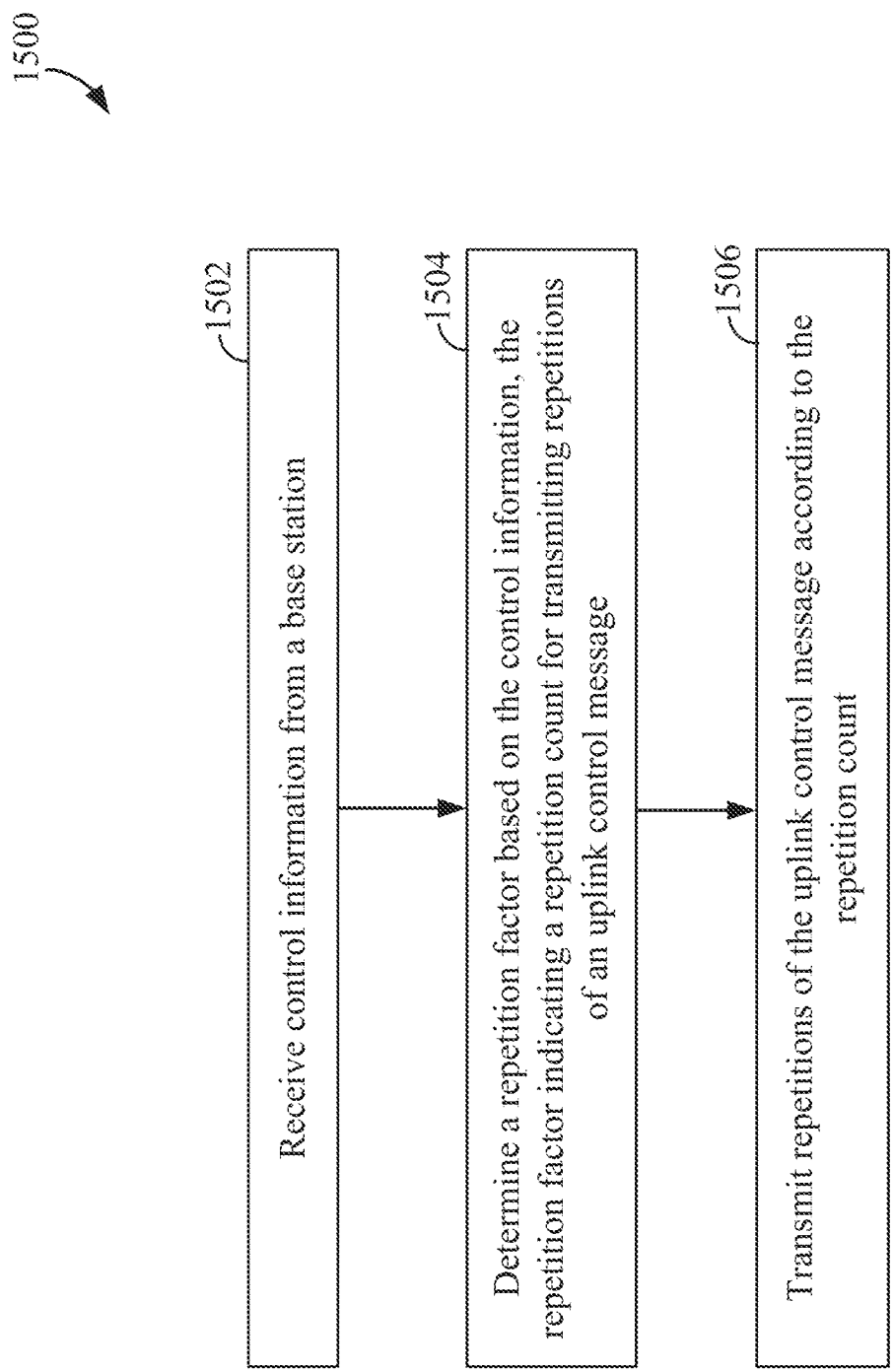
FIG. 15 is a flow chart illustrating an exemplary process for transmitting repetitions of an uplink control message according to some aspects.

FIG. 15 is a flow chart illustrating an exemplary process 1500 for transmitting repetitions of an uplink control message for coverage enhancement in accordance with some aspects of the present disclosure. As described below, some or all illustrated features may be omitted in a particular implementation within the scope of the present disclosure, and some illustrated features may not be required for the implementation of all examples. In some examples, the process 1500 may be carried out by the scheduled entity 1400 illustrated in FIG. 14. In some examples, the process 1500 may be carried out by any suitable apparatus or means for carrying out the functions or algorithm described below.

At block 1502, a UE can receive control information from a base station. The control information can be used for determining a repetition factor (e.g., PUCCH repetition factor) that indicates a repetition count of an uplink control message (e.g., PUCCH repetitions 612 or 920). In some aspects, the control information can explicitly indicate the repetition factor to the UE as described above in relation to FIGS. 6-8. In some aspects, the control information can enable the UE to implicitly determine the repetition factor as described above in relation to FIGS. 9-10. In one aspect, the communication and processing circuitry 1440 (see FIG. 14) can provide a means to receive the control information from the base station. In some aspects, the UE can receive the control information via DCI, MAC CE, and/or RRC signaling.

At block 1504, the UE can determine a repetition factor based on the control information. The repetition factor can indicate a repetition count for transmitting repetitions of an uplink control message (e.g., PUCCH). In one aspect, the uplink control enhancement circuitry 1442 can provide a means to determine the repetition factor based on the control information received from the base station. In one example, the control information can include an explicit indication of the repetition factor for repeating the uplink control message. The explicit indication can directly indicate the actual number (e.g., counts) of repetitions. For example, the indication may be a bit string that indicates a value of the PUCCH repetition factor or an index value for identifying a PUCCH repetition factor among a plurality of predefined PUCCH repetition factors (e.g., table 700 in FIG. 7). In one example, the explicit indication of PUCCH repetition factor may be carried in a DCI or MAC CE.

In one aspect, the control information can enable the implicit indication of the repetition factor, for example, for a PUCCH transmission. For example, the control information can provide a configuration that indicates a correspondence between each of one or more transmit beams of the base station to one or more repetition factors of the uplink control message. In this case, the UE can determine or select the repetition factor based on, at least in part, the current or active transmit beam, a TCI state, an active control beam, or a beam related to the active beam of the base station. In one example, the UE can receive the configuration indicating the correspondence via upper layer signaling, RRC signaling, semi-persistent signaling, and the like.

In some aspects, the control information can include a configuration that indicates one or more rules (e.g., restrictions) associated with one or more PUCCH parameters for dynamically determining the repetition factor. For example, the configuration may indicate one or more rules associated with PUCCH formats, UCI sizes, PUCCH resource sets, or code rates, among other examples. The UE can use the rules to dynamically determine or interpret a PUCCH repetition factor indication that can be explicitly indicated or implicitly indicated by a base station as described herein. For example, the UE can interpret a certain value of the PUCCH repetition factor indication into different repetition factors depending on the PUCCH format, UCI size, PUCCH resource set, or code rate in use.

At block 1506, the UE can transmit repetitions of the uplink control message according to the repetition count or repetition factor. For example, the UE can transmit a plurality of PUCCH transmissions that are repeated according to the PUCCH repetition factor determined in block 1504. In one example, the communication and processing circuitry 1440 can provide a means to transmit the repetitions of uplink control messages (e.g., PUCCH transmissions) to the base station. In some aspects, the UE can transmit repetitions of the uplink control message (e.g., 2 or more repetitions of a PUCCH transmission) using the same communication resources. In some aspects, the UE can transmit different transmissions of the repeated PUCCH transmissions using different communication resources.

A first aspect of the disclosure provides a user equipment (UE) for wireless communication, comprising: a communication interface for wireless communication; a memory; and a processor operatively coupled to the communication interface and the memory, wherein the processor and the memory are configured to: receive, from a base station, control information via the communication interface; determine a repetition factor based on the control information, the repetition factor indicating a repetition count for transmitting repetitions of an uplink control message; and transmit, to the base station via the communication interface, repetitions of the uplink control message according to the repetition count.

In a second aspect, alone or in combination with the first aspect, wherein the control information comprises a value that indicates at least one of: the repetition factor among a plurality of predetermined repetition factors; or the repetition factor in relation to a previous repetition factor.

In a third aspect, alone or in combination with any of the first to second aspects, wherein the control information indicates an effective time interval of the repetition factor.

In a fourth aspect, alone or in combination with any of the first to second aspects, wherein the processor and the memory are further configured to: transmit, to the base station, a request for the repetition factor, wherein the request is configured to indicate a number of repetitions of the uplink control message.

In a fifth aspect, alone or in combination with the first aspect, wherein the control information indicates a correspondence between each of one or more transmit beams of the base station to one or more repetition factors, and wherein the processor and the memory are further configured to: determine, according to the correspondence, the repetition factor for transmitting the uplink control message based at least in part on an active transmit beam of the one or more transmit beams.

In a sixth aspect, alone or in combination with the fifth aspect, wherein the processor and the memory are further configured to determine the active transmit beam based on, at least one of: a downlink shared channel transmission associated with a feedback message included in the uplink control message; an active control beam of the base station; or a transmission configuration indicator state for a downlink message.

In a seventh aspect, alone or in combination with any of the fifth to sixth aspects, wherein the processor and the memory are further configured to: receive, from the base station, an indication to override the correspondence between the repetition factor and the active transmit beam of the base station; and transmit the repetitions of the uplink control message using an updated repetition factor based at least in part on the indication.

In an eighth aspect, alone or in combination with any of the first, second, fifth, and sixth aspects, wherein the processor and the memory are further configured to: determine a physical uplink control channel (PUCCH) parameter; and determine the repetition factor based on the PUCCH parameter and one or more rules associated with the PUCCH parameter, wherein the PUCCH parameter comprises at least one of a PUCCH format, an uplink control information (UCI) size, a PUCCH resource set, or a code rate used by the base station.

A ninth aspect of the disclosure provides a method of wireless communication at a user equipment (UE), comprising: receiving control information from a base station; determining a repetition factor based on the control information, the repetition factor indicating a repetition count for transmitting repetitions of an uplink control message; and transmitting, to the base station, repetitions of the uplink control message according to the repetition count.

In a tenth aspect, alone or in combination with the ninth aspect, wherein the control information comprises a value that indicates at least one of: the repetition factor among a plurality of predetermined repetition factors; or the repetition factor in relation to a previous repetition factor.

In an eleventh aspect, alone or in combination with any of the ninth to tenth aspects, wherein the control information indicates an effective time interval of the repetition factor.

In a twelfth aspect, alone or in combination with any of the ninth to tenth aspects, the method further comprising: transmitting, to the base station, a request for the repetition factor, wherein the request is configured to indicate a number of repetitions of the uplink control message.

In a thirteenth aspect, alone or in combination with the ninth aspect, wherein the control information indicates a correspondence between each of one or more transmit beams of the base station to one or more repetition factors, and further comprising: determining, according to the correspondence, the repetition factor for transmitting the uplink control message based at least in part on an active transmit beam of the one or more transmit beams.

In a fourteenth aspect, alone or in combination with the ninth aspect, the method further comprising: determining the active transmit beam based on, at least one of: a downlink shared channel transmission associated with a feedback message included in the uplink control message; an active control beam of the base station; or a transmission configuration indicator state for a downlink message.

In a fifteenth aspect, alone or in combination with any of the thirteenth to fourteenth aspects, the method further comprising: receiving, from the base station, an indication to override the correspondence between the repetition factor and the active transmit beam of the base station; and transmitting the repetitions of the uplink control message using an updated repetition factor based at least in part on the indication.

In a sixteenth aspect, alone or in combination with any of the ninth, tenth, thirteenth, and fourteenth aspects, the method further comprising: determining a physical uplink control channel (PUCCH) parameter; and determining the repetition factor based on the PUCCH parameter and one or more rules associated with the PUCCH parameter, wherein the PUCCH parameter comprises at least one of a PUCCH format, an uplink control information (UCI) size, a PUCCH resource set, or a code rate used by the base station.

A seventeenth aspect of the disclosure provides a base station for wireless communication, comprising: a communication interface for wireless communication; a memory; and a processor operatively coupled to the communication interface and the memory, wherein the processor and the memory are configured to: transmit, to a user equipment (UE), control information via the communication interface, the control information comprising an indication of a repetition factor corresponding to a repetition count of an uplink control message; and receive, from the UE via the communication interface, the uplink control message repeated according to the repetition count.

In an eighteenth aspect, alone or in combination with the seventeenth aspect, wherein the control information comprises a value that indicates at least one of: the repetition factor among a plurality of predetermined repetition factors; or the repetition factor in relation to a previous repetition factor.

In a nineteenth aspect, alone or in combination with any of the seventeenth to eighteenth aspects, wherein the control information indicates an effective time interval of the repetition factor.

In a twentieth aspect, alone or in combination with any of the seventeenth to eighteenth aspects, wherein the processor and the memory are further configured to: receive, from the UE, a request for the repetition factor, wherein the request is configured to indicate a number of repetitions of the uplink control message.

In a twenty-first aspect, alone or in combination with the seventeenth aspect, wherein the control information indicates a correspondence between each of one or more transmit beams of the base station to one or more repetition factors, and wherein the processor and the memory are further configured to: receive repetitions of the update control message according to the repetition factor determined based at least in part on an active transmit beam of the one or more transmit beams.

In a twenty-second aspect, alone or in combination with the twenty-first aspect, wherein the processor and the memory are further configured to: transmit, to the UE, an indication to override the correspondence between the repetition factor and the active transmit beam of the base station; and receive the repetitions of the uplink control message using an updated repetition factor based at least in part on the indication.

In a twenty-third aspect, alone or in combination with any of the seventeenth, eighteenth, twenty-first, and twenty-second aspects, wherein the control information comprises one or more rules for determining the repetition factor based at least in part on a physical uplink control channel (PUCCH) parameter, wherein the PUCCH parameter comprises at least one of a PUCCH format, an uplink control information (UCI) size, a PUCCH resource set, or a code rate used by the base station.

A twenty-fourth aspect of the disclosure provides a method for wireless communication at a base station, the method comprising: transmitting control information to a user equipment (UE), the control information comprising an indication of a repetition factor corresponding to a repetition count of an uplink control message; and receiving, from the UE, the uplink control message repeated according to the repetition count.

In a twenty-fifth aspect, alone or in combination with the twenty-fourth aspect, wherein the control information comprises a value that indicates at least one of: the repetition factor among a plurality of predetermined repetition factors; or the repetition factor in relation to a previous repetition factor.

In a twenty-sixth aspect, alone or in combination with any of the twenty-fourth to twenty-fifth aspects, wherein the control information indicates an effective time interval of the repetition factor.

In a twenty-seventh aspect, alone or in combination with any of the twenty-fourth to twenty-fifth aspects, the method further comprising: receiving, from the UE, a request for the repetition factor, wherein the request is configured to indicate a number of repetitions of the uplink control message.

In a twenty-eighth aspect, alone or in combination with the twenty-fourth aspect, wherein the control information indicates a correspondence between each of one or more transmit beams of the base station to one or more repetition factors, and further comprising: receiving repetitions of the update control message according to the repetition factor determined based at least in part on an active transmit beam of the one or more transmit beams.

In a twenty-ninth aspect, alone or in combination with the twenty-eighth aspect, the method further comprising: transmitting, to the UE, an indication to override the correspondence between the repetition factor and the active transmit beam of the base station; and receiving the repetitions of the uplink control message using an updated repetition factor based at least in part on the indication.

In a thirtieth aspect, alone or in combination with any of the twenty-fourth, twenty-fifth, twenty-eighth, and twenty-ninth aspects, wherein the control information comprises one or more rules for determining the repetition factor based at least in part on a physical uplink control channel (PUCCH) parameter, wherein the PUCCH parameter comprises at least one of a PUCCH format, an uplink control information (UCI) size, a PUCCH resource set, or a code rate used by the base station.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A user equipment (UE) for wireless communication, comprising:
a communication interface for wireless communication;
one or more memories; and
one or more processors coupled to the communication interface and the one or more memories,
the one or more processors configured to:
receive, from a base station, downlink control information (DCI) via the communication interface, the DCI configured to indicate a correspondence between each of one or more transmit beams of the base station to one or more repetition factors;
determine, according to the correspondence, a repetition factor among the one or more repetition factors for transmitting an uplink control message based at least in part on an active transmit beam of the one or more transmit beams, the repetition factor indicating a repetition count for transmitting repetitions of an uplink control message; and
transmit, to the base station via the communication interface, repetitions of the uplink control message according to the repetition count.

2. The UE of claim 1, wherein the DCI comprises a value that indicates at least one of:
the repetition factor among a plurality of predetermined repetition factors; or
the repetition factor in relation to a previous repetition factor.

3. The UE of claim 1, wherein the DCI indicates an effective time interval of the repetition factor.

4. The UE of claim 1, wherein the one or more processors are further configured to:
transmit, to the base station, a request for the repetition factor, wherein the request is configured to indicate a number of repetitions of the uplink control message.

5. The UE of claim 1, wherein the one or more processors are further configured to determine the active transmit beam based on, at least one of:
a downlink shared channel transmission associated with a feedback message included in the uplink control message;
an active control beam of the base station; or
a transmission configuration indicator state for a downlink message.

6. The UE of claim 1, wherein the one or more processors are further configured to:
receive, from the base station, an indication to override the correspondence between the repetition factor and the active transmit beam of the base station; and
transmit the repetitions of the uplink control message using an updated repetition factor based at least in part on the indication.

7. The UE of claim 1, wherein the one or more processors are further configured to:
determine a physical uplink control channel (PUCCH) parameter; and
interpret the DCI using one or more rules associated with the PUCCH parameter to determine the repetition factor, wherein the PUCCH parameter comprises at least one of a PUCCH format, an uplink control information (UCI) size, a PUCCH resource set, or a code rate used by the base station.

8. A method of wireless communication at a user equipment (UE), comprising:
receiving downlink control information (DCI) from a base station, the DCI configured to indicate a correspondence between each of one or more transmit beams of the base station to one or more repetition factors;
determining, according to the correspondence, a repetition factor among the one or more repetition factors for transmitting an uplink control message based at least in part on an active transmit beam of the one or more transmit beams, the repetition factor indicating a repetition count for transmitting repetitions of an uplink control message; and
transmitting, to the base station, repetitions of the uplink control message according to the repetition count.

9. The method of claim 8, wherein the DCI comprises a value that indicates at least one of:
the repetition factor among a plurality of predetermined repetition factors; or
the repetition factor in relation to a previous repetition factor.

10. The method of claim 8, wherein the DCI indicates an effective time interval of the repetition factor.

11. The method of claim 8, further comprising:
transmitting, to the base station, a request for the repetition factor, wherein the request is configured to indicate a number of repetitions of the uplink control message.

12. The method of claim 8, further comprising: determining the active transmit beam based on, at least one of:
a downlink shared channel transmission associated with a feedback message included in the uplink control message;
an active control beam of the base station; or
a transmission configuration indicator state for a downlink message.

13. The method of claim 8, further comprising:
receiving, from the base station, an indication to override the correspondence between the repetition factor and the active transmit beam of the base station; and
transmitting the repetitions of the uplink control message using an updated repetition factor based at least in part on the indication.

14. The method of claim 8, further comprising:
determining a physical uplink control channel (PUCCH) parameter; and
interpreting the DCI using one or more rules associated with the PUCCH parameter to determine the repetition factor, wherein the PUCCH parameter comprises at least one of a PUCCH format, an uplink control information (UCI) size, a PUCCH resource set, or a code rate used by the base station.

15. A base station for wireless communication, comprising:
one or more memories; and
one or more processors coupled to the one or more memories,
the one or more processors configured to:
transmit, to a user equipment (UE), downlink control information (DCI), the DCI configured to indicate a correspondence between each of one or more transmit beams of the base station to one or more repetition factors, the DCI comprising an indication of a repetition factor among the one or more repetition factors corresponding to a repetition count of an uplink control message; and receive, from the UE, repetitions of the uplink control message according to the repetition factor determined based at least in part on an active transmit beam of the one or more transmit beams.

16. The base station of claim 15, wherein the DCI comprises a value that indicates at least one of:

the repetition factor among a plurality of predetermined repetition factors; or the repetition factor in relation to a previous repetition factor.

17. The base station of claim 15, wherein the DCI indicates an effective time interval of the repetition factor.

18. The base station of claim 15, wherein the one or more processors are further configured to:

receive, from the UE, a request for the repetition factor, wherein the request is configured to indicate a number of repetitions of the uplink control message.

19. The base station of claim 15, wherein the one or more processors are further configured to:

transmit, to the UE, an indication to override the correspondence between the repetition factor and the active transmit beam of the base station; and receive the repetitions of the uplink control message using an updated repetition factor based at least in part on the indication.

20. The base station of claim 15, wherein the DCI comprises one or more rules for determining the repetition factor based at least in part on a physical uplink control channel (PUCCH) parameter, wherein the PUCCH parameter comprises at least one of a PUCCH format, an uplink control information (UCI) size, a PUCCH resource set, or a code rate used by the base station.

21. A method for wireless communication at a base station, the method comprising:

transmitting downlink control information (DCI) to a user equipment (UE), the DCI configured to indicate a correspondence between each of one or more transmit beams of the base station to one or more repetition factors, the DCI comprising an indication of a repetition factor among the one or more repetition factors corresponding to a repetition count of an uplink control message; and receiving, from the UE, repetitions of the uplink control message according to the repetition factor determined based at least in part on an active transmit beam of the one or more transmit beams.

22. The method of claim 21, wherein the DCI comprises a value that indicates at least one of:

the repetition factor among a plurality of predetermined repetition factors; or the repetition factor in relation to a previous repetition factor.

23. The method of claim 21, wherein the DCI indicates an effective time interval of the repetition factor.

24. The method of claim 21, further comprising:

receiving, from the UE, a request for the repetition factor, wherein the request is configured to indicate a number of repetitions of the uplink control message.

25. The method of claim 21, further comprising:

transmitting, to the UE, an indication to override the correspondence between the repetition factor and the active transmit beam of the base station; and receiving the repetitions of the uplink control message using an updated repetition factor based at least in part on the indication.

26. The method of claim 21, wherein the DCI comprises one or more rules for determining the repetition factor based at least in part on a physical uplink control channel (PUCCH) parameter, wherein the PUCCH parameter comprises at least one of a PUCCH format, an uplink control information (UCI) size, a PUCCH resource set, or a code rate used by the base station.

* * * * *